(12) United States Patent
Ozawa

(10) Patent No.: US 10,014,612 B2
(45) Date of Patent: Jul. 3, 2018

(54) CONNECTOR MODULE AND HYDRAULIC PRESSURE CONTROL DEVICE

(71) Applicant: Yazaki Corporation, Tokyo (JP)

(72) Inventor: Keisuke Ozawa, Shizuoka (JP)

(73) Assignee: YAZAKI CORPORATION, Minato-ku, Tokyo (JP)

( * ) Notice: Subject to any disclaimer, the term of this patent is extended or adjusted under 35 U.S.C. 154(b) by 0 days.

(21) Appl. No.: 15/452,857

(22) Filed: Mar. 8, 2017

(65) Prior Publication Data

US 2017/0264038 A1 Sep. 14, 2017

(30) Foreign Application Priority Data

Mar. 9, 2016 (JP) ................. 2016-045691

(51) Int. Cl.

| H01R 12/00 | (2006.01) |
|---|---|
| H05K 1/00 | (2006.01) |
| H01R 13/00 | (2006.01) |
| F16K 31/06 | (2006.01) |
| H01R 13/514 | (2006.01) |

(Continued)

(52) U.S. Cl.

CPC ....... *H01R 13/005* (2013.01); *F16H 61/0009* (2013.01); *F16K 27/003* (2013.01); *F16K 31/0675* (2013.01); *H01R 13/501* (2013.01); *H01R 13/514* (2013.01); *F16H 61/0006* (2013.01); *H01R 12/774* (2013.01)

(58) Field of Classification Search

CPC ..... B60T 8/3672; B60T 8/3675; H01R 9/226; H05K 5/0026; F16K 31/0675; F15B 13/044

USPC .......... 251/129.15; 303/119.1, 119.2, 119.3; 439/76.2, 640, 949

See application file for complete search history.

(56) References Cited

U.S. PATENT DOCUMENTS

| 5,288,141 A | * | 2/1994 | Isshiki | ................. B60T 8/344 |
| | | | | 303/119.1 |
| 5,895,027 A | | 4/1999 | Yagi | |

(Continued)

FOREIGN PATENT DOCUMENTS

| JP | H01-171518 U | 12/1989 |
| JP | H06-13556 Y2 | 4/1994 |

(Continued)

OTHER PUBLICATIONS

Communication dated Feb. 6, 2018, issued by the Japanese Patent Office in counterpart Japanese application No. 2016-045691.

*Primary Examiner* — Hae Moon Hyeon
(74) *Attorney, Agent, or Firm* — Sughrue Mion, PLLC

(57) ABSTRACT

A plurality of electrical connection structures are provided. Each of the electrical connection structures includes a plurality of electrical wires each having a wiring portion and an electrical connection portion directly or indirectly electrically connected to an electromagnetic valve (a control unit) at an end of the wiring portion, and wiring plates on which wiring portions are arranged. Between the electrical connection structures disposed next to each other, another end of the wiring portion of the electrical connection structure establishes an electrical connection relation with the another end of the wiring portion of the electrical connection structure. Between the electrical connection structures disposed next to each other, a movable portion capable of changing a relative positional relation therebetween is provided.

7 Claims, 21 Drawing Sheets

(51) Int. Cl.
*F16K 27/00* (2006.01)
*H01R 13/50* (2006.01)
H01R 12/77 (2011.01)
F16H 61/00 (2006.01)

(56) References Cited

U.S. PATENT DOCUMENTS

| | | | | |
|---|---|---|---|---|
| 6,155,874 | A * | 12/2000 | Endo | H01R 13/24 439/546 |
| 7,172,428 | B2 * | 2/2007 | Huang | H01R 35/00 439/11 |
| 7,374,425 | B1 * | 5/2008 | Kuo | H01R 25/003 439/31 |
| 8,771,015 | B2 * | 7/2014 | Inoue | H01R 4/70 439/604 |
| 2001/0003688 | A1 * | 6/2001 | Kondo | B29C 45/14426 439/604 |
| 2001/0017214 | A1 | 8/2001 | Saeki et al. | |
| 2011/0232409 | A1 | 9/2011 | Sueshige et al. | |
| 2017/0218982 | A1 * | 8/2017 | Ozawa | F04D 29/667 |

FOREIGN PATENT DOCUMENTS

| | | |
|---|---|---|
| JP | 8-051019 A | 2/1996 |
| JP | 9-306558 A | 11/1997 |
| JP | 11-008023 A | 1/1999 |
| JP | 2001-177944 A | 6/2001 |
| JP | 2001-271918 A | 10/2001 |
| JP | 2002-031263 A | 1/2002 |
| JP | 2004-028186 A | 1/2004 |
| JP | 2010-216552 A | 9/2010 |
| JP | 2011-185363 A | 9/2011 |
| JP | 2012-164447 A | 8/2012 |
| JP | 2013-148203 A | 8/2013 |

\* cited by examiner

CONNECTOR MODULE AND HYDRAULIC PRESSURE CONTROL DEVICE

CROSS-REFERENCE TO RELATED APPLICATION(S)

The present application claims priority to and incorporates by reference the entire contents of Japanese Patent Application No. 2016-045691 filed in Japan on Mar. 9, 2016.

BACKGROUND OF THE INVENTION

1. Field of the Invention

The present invention relates to a connector module and a hydraulic pressure control device.

2. Description of the Related Art

Techniques are known that relate to a hydraulic pressure control device including a hydraulic pressure circuit body provided with a hydraulic pressure circuit for moving an operating fluid of an object to be controlled and an electromagnetic valve installed to the hydraulic pressure circuit body to adjust the flow rate of the operating fluid in the hydraulic pressure circuit (see Japanese Patent Application Laid-open No. 11-8023, Japanese Patent Application Laid-open No. 2010-216552, Japanese Patent Application Laid-open No. 2002-31263, Japanese Patent Application Laid-open No. 8-51019, Japanese Patent Application Laid-open No. 9-306558, Japanese Patent Application Laid-open No. 2012-164447, and Japanese Patent Application Laid-open No. 2004-28186).

Such a hydraulic pressure control device is provided with a connector module for electrically connecting the electromagnetic valve and a control unit for controlling driving of the electromagnetic valve. Known examples of the connector module include a connector module connecting the electromagnetic valve and the control unit with a wire harness, a connector module connecting the devices with a bus bar molded using a metal plate as a base metal, a connector module connecting the devices with a flexible printed circuit (FPC), a connector module connecting the devices with a wire routing circuit body having bent rigid wires and disposed on a face plate of a base member, and a connector module connecting the devices with an electrical wire routed on a face plate of a case. The electrical wire on the face plate of the case is electrically connected by an insulation-displacement connector of an electromagnetic valve exposed on the face plate. These conventional connector modules can be, however, still further improved in reducing the cost while sustaining satisfactory productivity and durability.

SUMMARY OF THE INVENTION

The present invention therefore aims to provide a connector module and a hydraulic pressure control device capable of reducing the cost while sustaining satisfactory productivity and durability.

In order to achieve the above mentioned object, a connector module according to one aspect of the present invention includes a plurality of electrical connection structures including a plurality of electrical wires each having a wiring portion and an electrical connection portion directly or indirectly electrically connected to an electrical connection target at one end of the wiring portion, and wiring plates on which the wiring portions are wired, wherein in the electrical connection structures disposed next to each other, the other end of the wiring portion of one of the electrical connection structures establishes an electrical connection relation with the other end of the wiring portion of the other electrical connection structure, and between the electrical connection structures disposed next to each other, a movable portion capable of changing a relative positional relation therebetween is provided.

According to another aspect of the present invention, in the connector module, it is preferable that the electrical wire is covered by an insulating coating, and a physical electrical connection part between the electrical wire and a counterpart is covered by an insulating member.

According to still another aspect of the present invention, in the connector module, it is preferable that the electrical connection structures disposed next to each other are connected to each other by the electrical wire that has the wiring portions wired on the wiring plates of the respective electrical connection structures, the electrical connection portions formed at both ends, and a movable electrical wire portion disposed between the wiring portions and on the movable portion.

According to still another aspect of the present invention, in the connector module, it is preferable that one of the electrical connection structures disposed next to each other is configured to electrically connect an electromagnetic valve, which is a control valve of a hydraulic pressure circuit body having a hydraulic pressure circuit for moving an operating fluid of an object to be controlled and serves as the electrical connection target capable of adjusting a flow rate of the operating fluid in the hydraulic pressure circuit, to the electrical connection portion of the electrical connection structure, and the other one of the electrical connection structures disposed next to each other is configured to electrically connect a control unit, which serves as the electrical connection target controlling driving of the electromagnetic valve, to the electrical connection portion of the other electrical connection structure.

A hydraulic pressure control device according to still another aspect of the present invention includes a hydraulic pressure circuit body that includes a hydraulic pressure circuit for moving an operating fluid of an object to be controlled; a control unit that controls the flow rate of the operating fluid in the hydraulic pressure circuit; an electromagnetic valve that is connected to the hydraulic pressure circuit body and adjusts the flow rate of the operating fluid in the hydraulic pressure circuit in accordance with driving control by the control unit; and a plurality of electrical connection structures that electrically connect at least two electrical connection targets to each other, wherein the electrical connection structure includes a plurality of electrical wires each having a wiring portion and an electrical connection portion directly or indirectly electrically connected to the electrical connection target at one end of the wiring portion and wiring plates on which the wiring portions are wired, in the electrical connection structures disposed next to each other, one end of the wiring portion of one of the electrical connection structures establishes an electrical connection relation with the other end of the wiring portion of the other electrical connection structure, between the electrical connection structures disposed next to each other, a movable portion capable of changing a relative positional relation therebetween is provided, and one of the electrical connection structures disposed next to each other has the electromagnetic valve serve as the electrical connection target and the other one of the electrical connection structures has the control unit serve as the electrical connection target.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

An embodiment of a connector module and a hydraulic pressure control device will now be described in detail with reference to the drawings. The embodiment is not intended to limit the scope of the present invention.

Embodiment

An embodiment of the connector module and the hydraulic pressure control device will now be described with reference to FIG. 1 to FIG. 22.

The hydraulic pressure control device according to the present invention adjusts the flow rate of an operating fluid sent to an object to be controlled and changes the fluid pressure of the operating fluid, thereby controlling operation of the object to be controlled. The hydraulic pressure control device includes a hydraulic pressure circuit body moving the operating fluid sent by pressure of a pump and the like inside the hydraulic pressure circuit body and at least one electromagnetic valve for adjusting the flow rate of the operating fluid. A hydraulic pressure circuit serving as a flow path for the operating fluid is formed inside the hydraulic pressure circuit body. The electromagnetic valve is a control valve capable of adjusting the flow rate of the operating fluid in the hydraulic pressure circuit.

Any kind of object to be controlled may be applicable as long as the object to be controlled operates using the fluid pressure of the operating fluid, and any kind of operating fluid may be applicable as long as the operating fluid can operate the object to be controlled. In this embodiment, an automatic transmission mounted on a vehicle and the like is described as an exemplary object to be controlled. In this case, an automatic transmission fluid (ATF) working for operation and lubrication of the automatic transmission is used as the operating fluid. The object to be controlled will be thus hereinafter described as an automatic transmission. The operating fluid will be described as a hydraulic oil, and the fluid pressure will be described as oil pressure.

Figure 1:
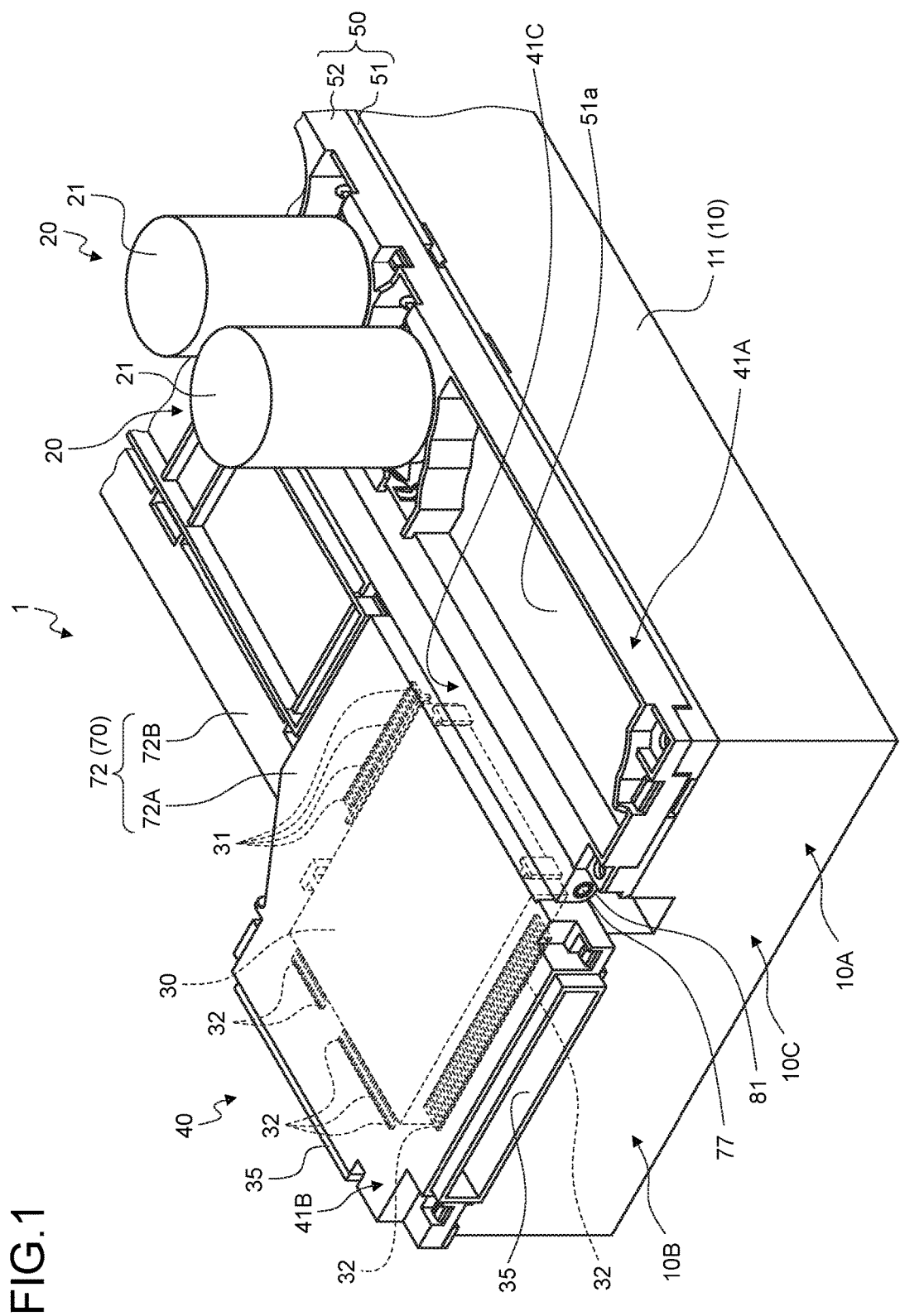
FIG. 1 is a perspective view of an exemplary connector module and an exemplary oil pressure control device (hydraulic pressure control device)
Figure 2:
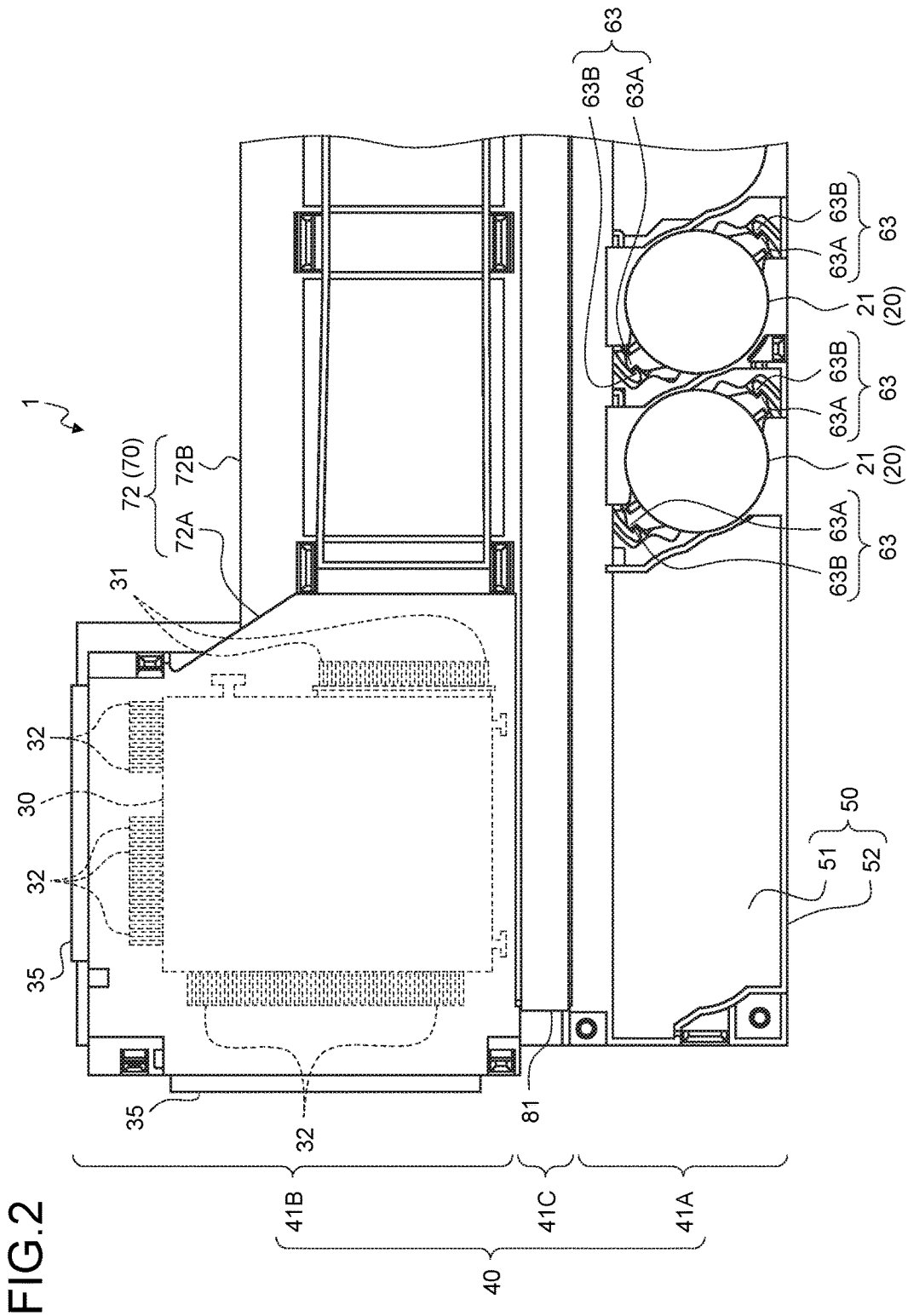
FIG. 2 is a top view of the exemplary connector module and oil pressure control device (hydraulic pressure control device)

The numeral 1 in FIGS. 1 and 2 indicates an oil pressure control device in the embodiment. The oil pressure control device 1 includes an oil pressure circuit body 10, an electromagnetic valve 20, a control unit 30, and a connector module 40. The oil pressure control device 1 adjusts the oil pressure inside the oil pressure circuit body 10, which is usually referred to as a valve body, by having the control unit 30 control the electromagnetic valve 20 to drive and controls the automatic transmission based on the oil pressure. In the oil pressure control device 1, the electromagnetic valve 20 and the control unit 30 are disposed on the oil pressure circuit body 10 with the connector module 40 interposed therebetween. The oil pressure control device 1 illustrated in FIGS. 1 and 2 is an extracted part of the oil pressure circuit body 10.

Figure 3:
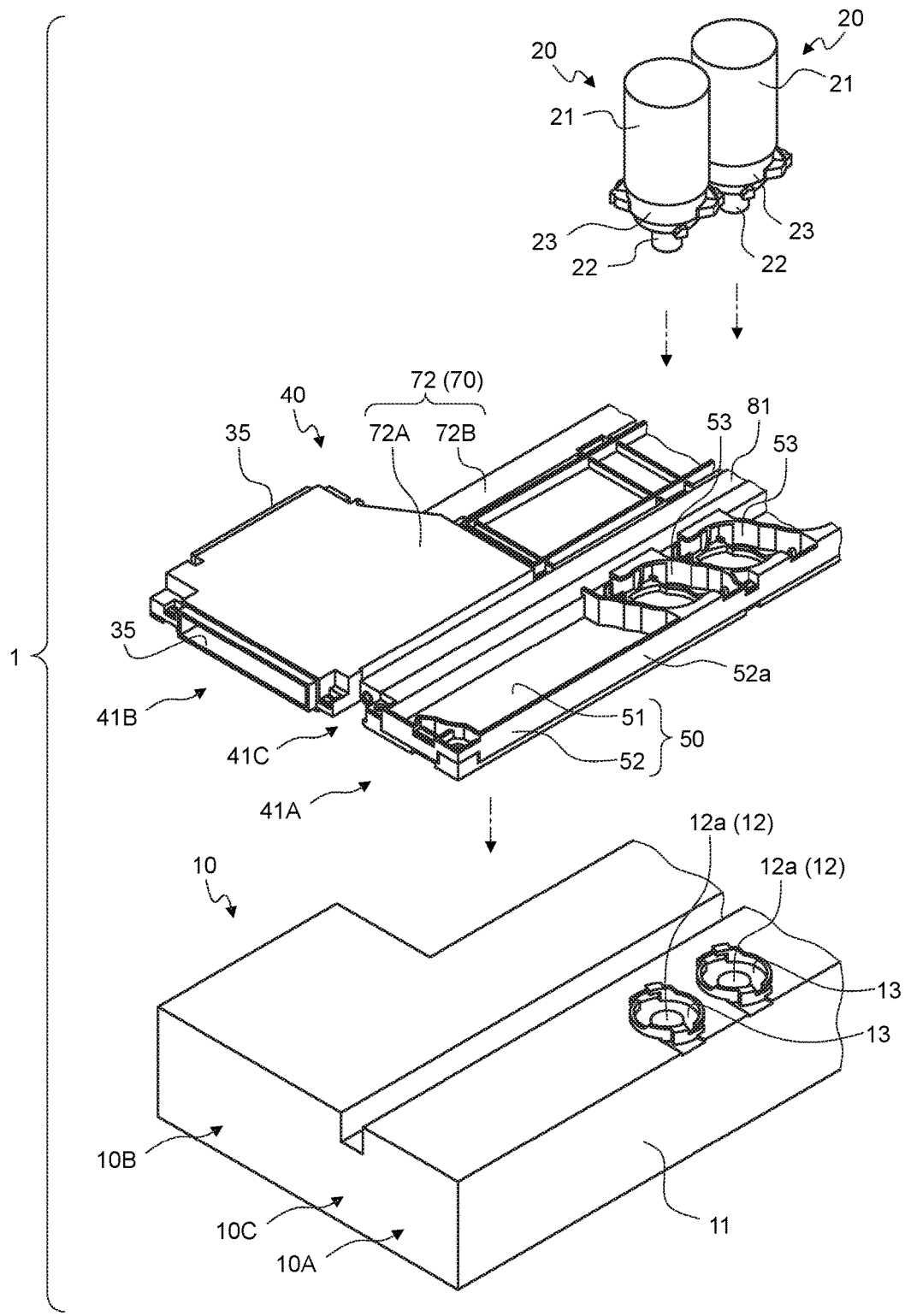
FIG. 3 is an exploded perspective view of the oil pressure control device (hydraulic pressure control device)

The oil pressure circuit body 10 is usually referred to as a valve body. The exemplary oil pressure circuit body 10 is broadly divided into a driving system placing unit 10A where the electromagnetic valve 20 is disposed, a control system placing unit 10B where the control unit 30 is disposed, and a connection unit 10C for connecting the driving system placing unit 10A and the control system placing unit 10B (FIGS. 1 and 3). The exemplary oil pressure circuit body 10 has the driving system placing unit 10A, the control system placing unit 10B, and the connection unit 10C integrally molded from a certain material (such as a metal material and a synthetic resin material).

Figure 4:
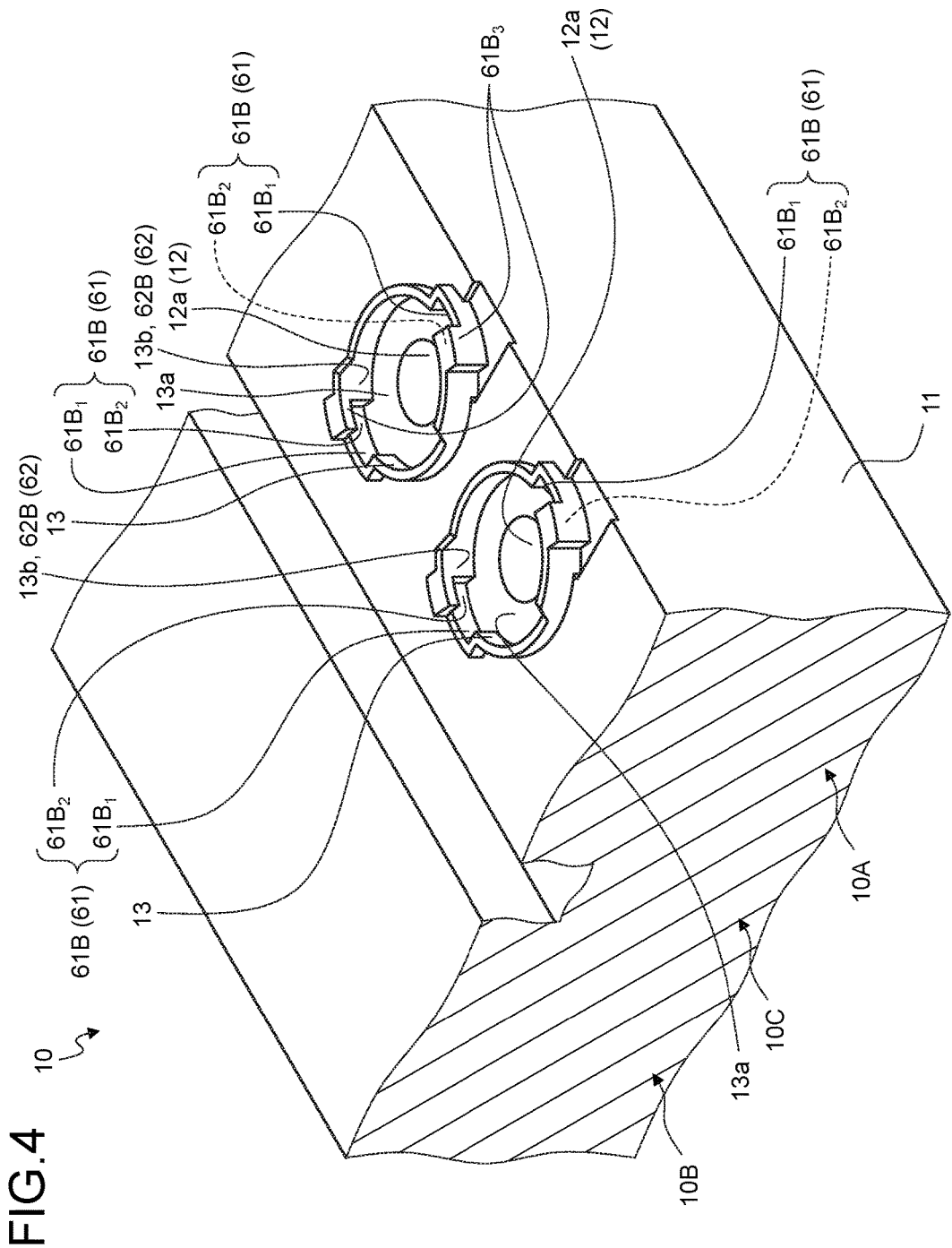
FIG. 4 is a perspective view of an oil pressure circuit body (hydraulic pressure circuit body)

Furthermore, the oil pressure circuit body 10 has a main portion 11 configured with the driving system placing unit 10A, the control system placing unit 10B, and the connection unit 10C. The oil pressure circuit body 10 further has oil pressure circuits 12 for moving a hydraulic oil of the automatic transmission (not illustrated) formed inside the main portion 11 (FIGS. 3 and 4). The oil pressure circuit 12 has a main flow path (not illustrated) configuring a flow path for the hydraulic oil flowing between a pump side and a control mechanism (such as a brake and a clutch) side of the automatic transmission and a flow rate adjusting path 12a communicating with the main flow path on the main flow path.

The main flow path connects an inflow port for the hydraulic oil sent by pressure from the pump side and a discharge port for discharging the hydraulic oil to the control mechanism side. The main flow path has various flow paths corresponding to the speeds of the automatic transmission. The flow rate adjusting path 12a is a cylindrical path on which a valve element 22 of the electromagnetic valve 20, which will be later described, reciprocates, and is provided to each valve element 22. The valve element 22 adjusts the flow rate of the hydraulic oil in the main flow path based on its position on the flow rate adjusting path 12a.

Figure 5:
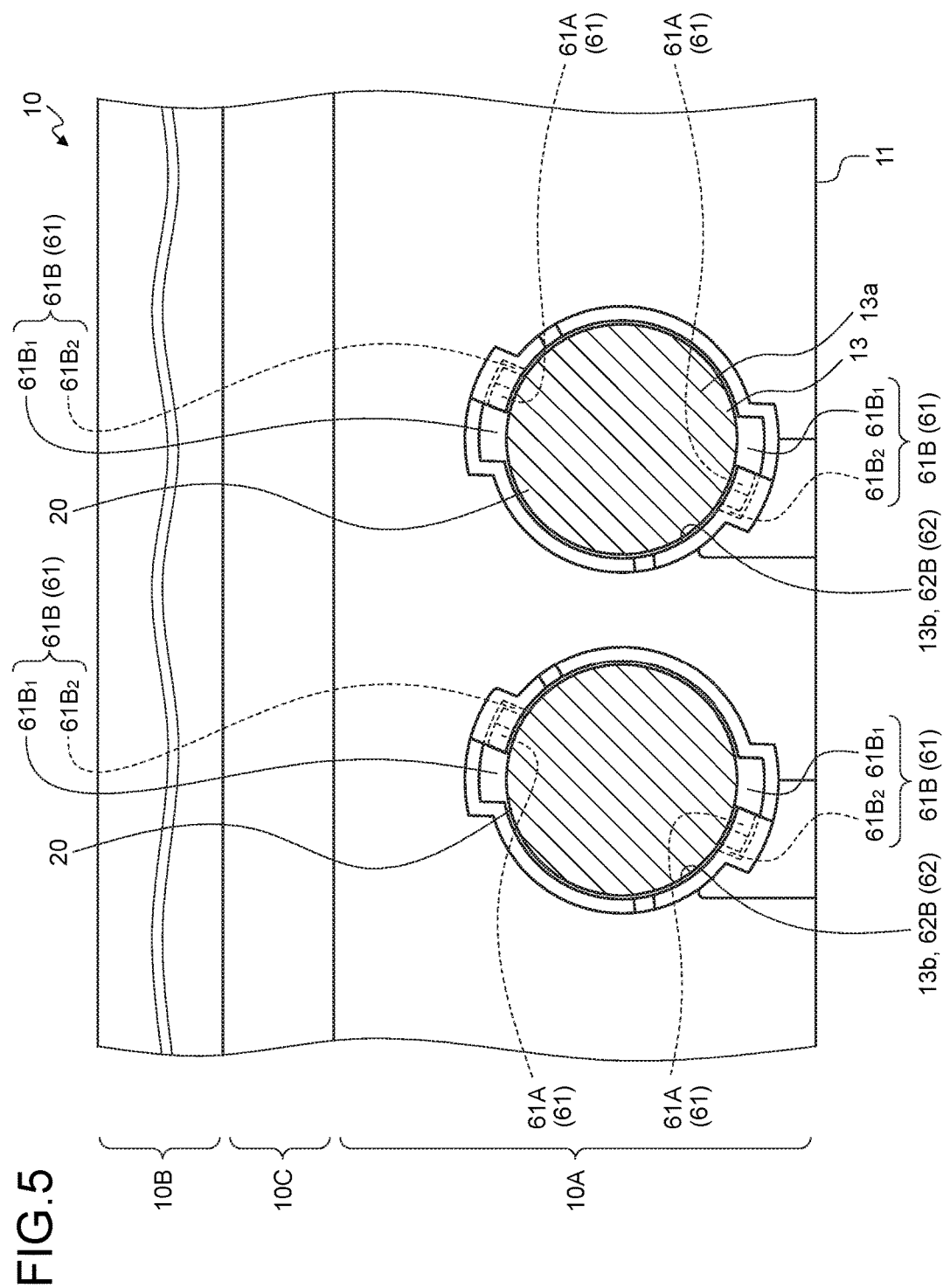
FIG. 5 is a top view of the oil pressure circuit body (hydraulic pressure circuit body)

Cylindrical accommodation spaces 13 for having the oil pressure circuit 12 communicate with the outside are formed on the oil pressure circuit body 10. The accommodation space 13 is concentrically arranged with the flow rate adjusting path 12a and communicates with the flow rate adjusting path 12a. The accommodation space 13 is a space for accommodating an accommodation body 23 of the later-described electromagnetic valve 20 and has a larger outer diameter than that of the flow rate adjusting path 12a. With this configuration, a bottom 13a of the accommodation space 13 is annularly formed on the oil pressure circuit body 10 (FIGS. 4 and 5). An annular front end surface 23a (in FIGS. 6 and 7) of the accommodation body 23 contacts with the bottom 13a when the accommodation body 23 is accommodated.

Figure 6:
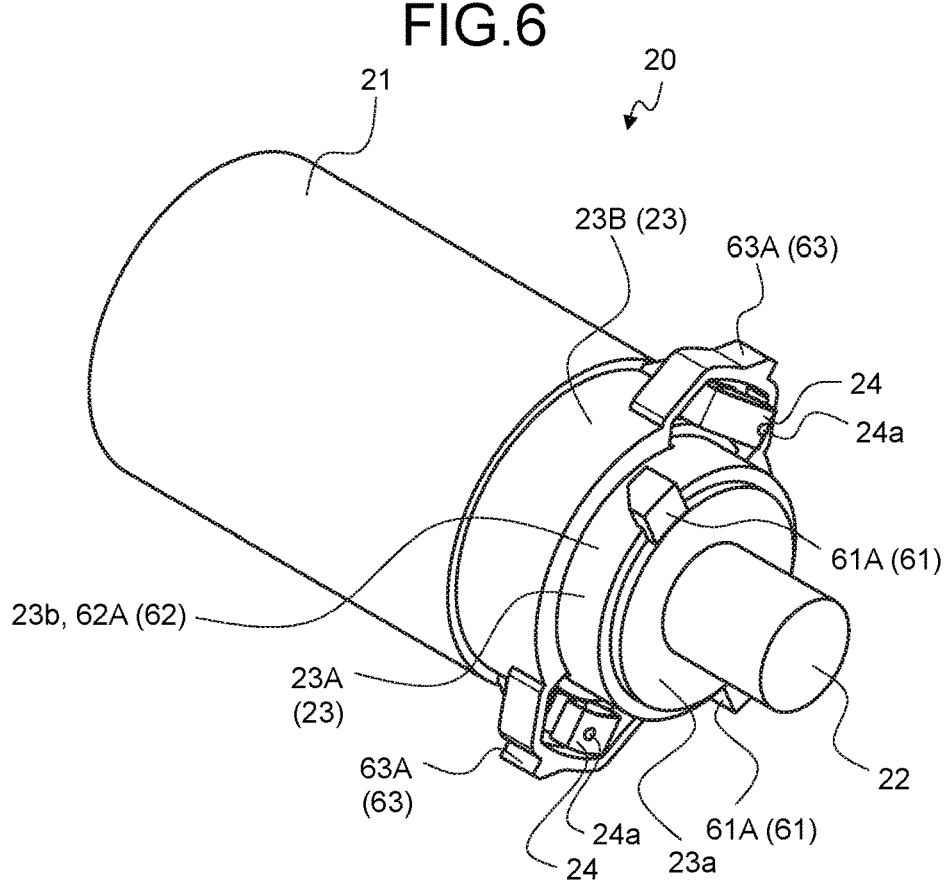
FIG. 6 is a perspective view of an electromagnetic valve.
Figure 7:
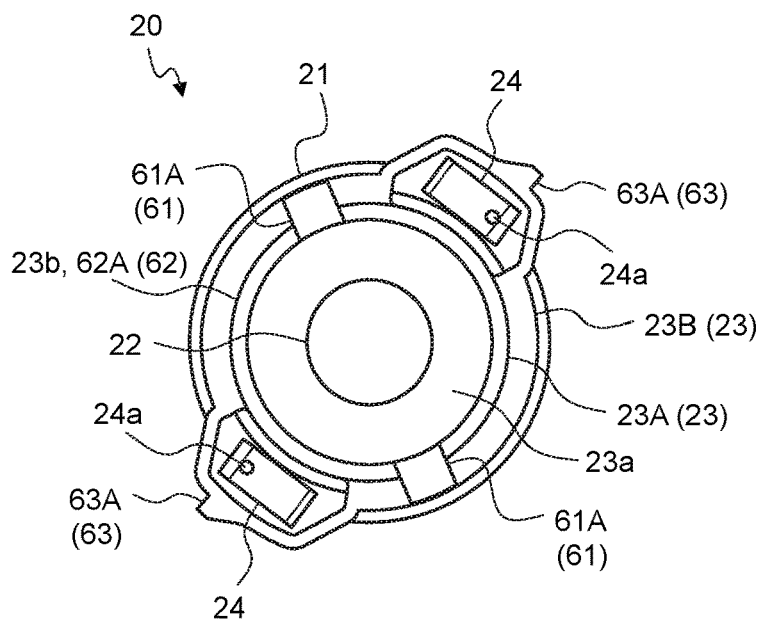
FIG. 7 is a view of the electromagnetic valve viewed from a valve element side.

The electromagnetic valve 20 includes a body 21 in which a driving mechanism such as a coil and a return spring is accommodated and the valve element 22 reciprocated by the driving mechanism in an axial direction (FIGS. 3, 6, and 7). The valve element 22 in FIGS. 3, 6, and 7 is depicted in a cylindrical shape for illustration; however, any shape is actually applicable. The valve element 22 is selected in a manner corresponding to the feature of the oil pressure circuit 12. Examples of the valve element 22 may include a spool-type valve (a spool valve), in which cylinders having respective different outer diameters are concentrically combined. The valve element 22 is concentrically disposed with respect to the flow rate adjusting path 12a and reciprocates in the flow rate adjusting path 12a along the center axis.

The electromagnetic valve 20 is further provided with a cylindrical or annular accommodation body 23 concentrically disposed with respect to the valve element 22. The accommodation body 23 is inserted into the accommodation space 13 of the oil pressure circuit body 10 along the center axial direction and is accommodated therein. With the accommodation body 23 accommodated in the accommodation space 13, the electromagnetic valve 20 is connected to the oil pressure circuit body 10. The electromagnetic valve 20 has the accommodation body 23 connected to the body 21 and has the valve element 22 project from the accommodation body 23 in a reciprocatable manner. The exemplary accommodation body 23 includes a first accommodation body 23A and a second accommodation body 23B concentrically disposed with respect to each other and having respective different outer diameters (FIGS. 6 and 7). The first accommodation body 23A has two cylindrical or annular bodies having different outer diameters in FIGS. 6 and 7; however, the bodies are described as a single cylindrical or annular body for convenient description. The second accommodation body 23B has a larger diameter than that of the first accommodation body 23A and is disposed in the body 21 side.

Furthermore, the electromagnetic valve 20 is provided with terminals 24 electrically connected to the driving mechanism. For obtaining an elastic force, the terminal 24 is formed by bending a base plate made from a conductive material such as metal and causes flexure when a load is applied to a later-described valve-side connection part 24a.

The control unit 30 is a control unit (specifically, an electronic control unit (ECU)) for providing overall control on the oil pressure control device 1 and controls the flow rate of the hydraulic oil in the oil pressure circuit 12 by controlling driving of the electromagnetic valve 20. The control unit 30 sends an instruction to the electromagnetic valve 20 to be controlled based on a target speed of the automatic transmission and controls the electromagnetic valve 20 to drive in the valve-opening side or the valve-closing side. The control unit 30 has at least the electromagnetic valve 20 as a direct control target and has the automatic transmission as an indirect control target. The control unit 30 includes a plurality of terminals 31 electrically connected to a counterpart electrical connection target (a direct control target, a sensor, and others) through the connector module 40 and a plurality of terminals 32 electrically connected to another counterpart electrical connection target (not illustrated) such as a power supply not through the connector module 40 (FIGS. 1 and 2).

The connector module 40 electrically connects at least two electrical connection targets and is provided with a plurality of electrical connection structures used for the connection between the objects. The electrical connection structure includes a plurality of electrical wires each having a wiring portion and an electrical connection portion directly or indirectly electrically connected to an electrical connection target at an end of the wiring portion, and includes wiring plates on which the wiring portions are arranged. The electrical wires are arranged using, for example, a wiring machine (not illustrated).

The connector module 40 has at least two electrical connection structures disposed next to each other. In the adjacent electrical connection structures, the other end of the wiring portion of one of the electrical connection structures establishes an electrical connection relation with the other end of the wiring portion of the other electrical connection structure. With this configuration, the connector module 40 is capable of electrically connecting two electrical connection targets to each other. The electrical connection relation between the electrical connection structures may be established by electrically connecting electrical wires to each other, the electrical wires being individually arranged on the respective electric connection structural bodies by welding, by using terminals, or by other methods. In this case, the other end of an electrical wire of the electrical wires serves as a counterpart electrical connection portion for the other end of another electrical wire, and the other end of the other electrical wire serves as a counterpart electrical connection portion for the other end of the electrical wire. The electrical connection relation between the electrical connection structures may be established using an electrical wire arranged across the electrical connection structures. The electrical wire arranged across the electrical connection structures includes wiring portions arranged on wiring plates of the respective electrical connection structures, electrical connection portions formed at both ends, and a movable electrical wire portion arranged between the wiring portions and on a later-described movable portion. In the connector module 40, the electrical connection structures disposed next to each other may be connected to each other by physically electrically connecting between the electrical wires of the respective electrical connection structures or by using an electrical wire arranged across the electrical connection structures.

Between the electrical connection structures disposed next to each other, the above-mentioned movable portion capable of relatively changing the positional relation therebetween is provided. This configuration allows the connector module 40 to be more customizable in accordance with the shapes and arrangements of counterpart devices to which the respective electrical connection structures are installed.

The exemplary connector module 40 electrically connects two types of counterpart electrical connection targets to each other and includes electrical connection structures for the respective types of electrical connection targets. One of two types of counterpart electrical connection targets is the electromagnetic valves 20 and the other one is the control unit 30. The exemplary connector module 40 arranges the two electrical connection structures in side by side relation. One of the electrical connection structures disposed next to each other has its electrical connection portions connected to the electromagnetic valves 20 each serving as an electrical connection target. The other one of the electrical connection structures disposed next to each other has its electrical connection portion connected to the control unit 30 serving as another electrical connection target.

Figure 8:
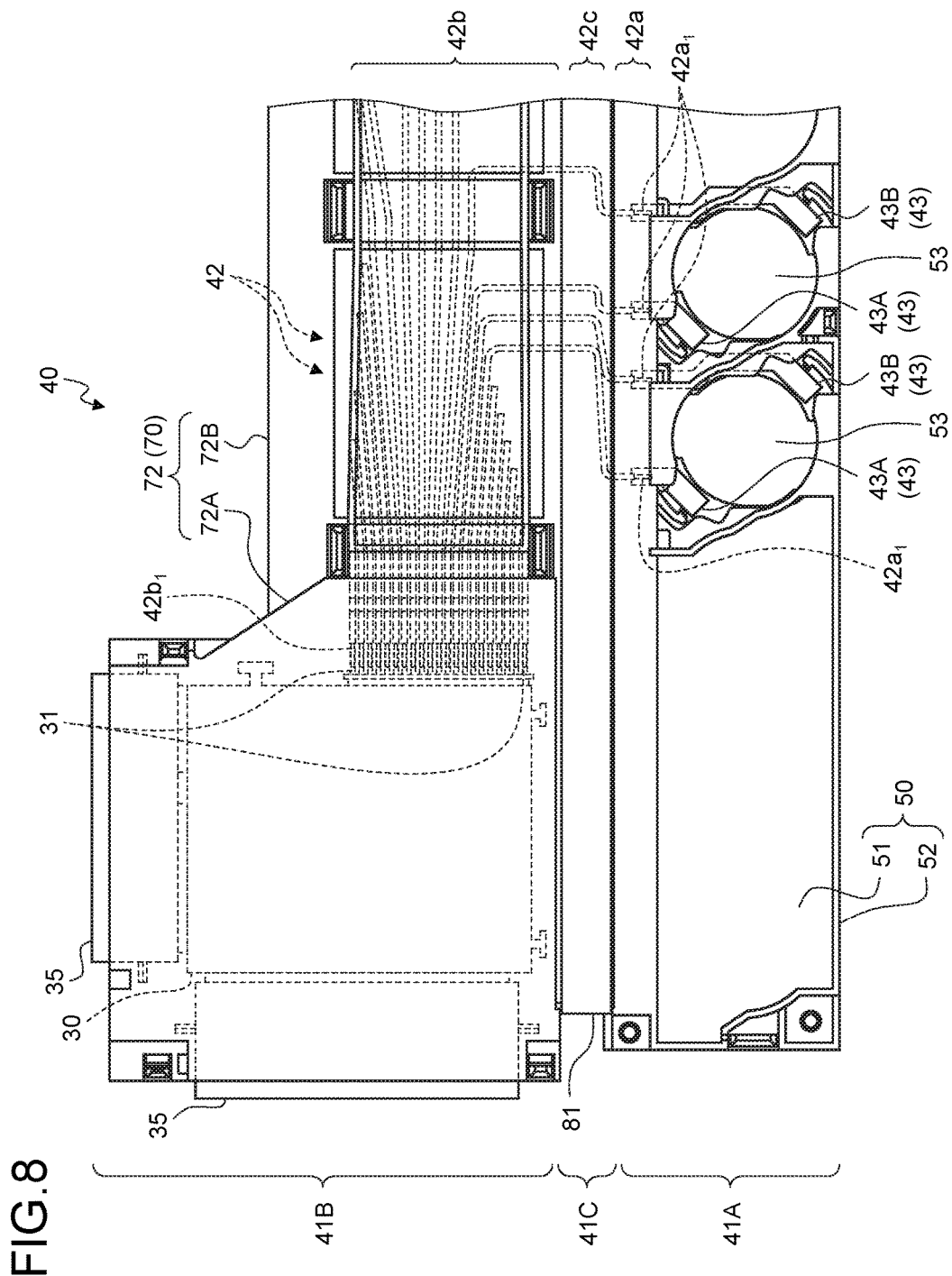
FIG. 8 is a top view of the exemplary connector module and oil pressure control device (hydraulic pressure control device) and illustrates an essential structure inside the connector module.
Figure 9:
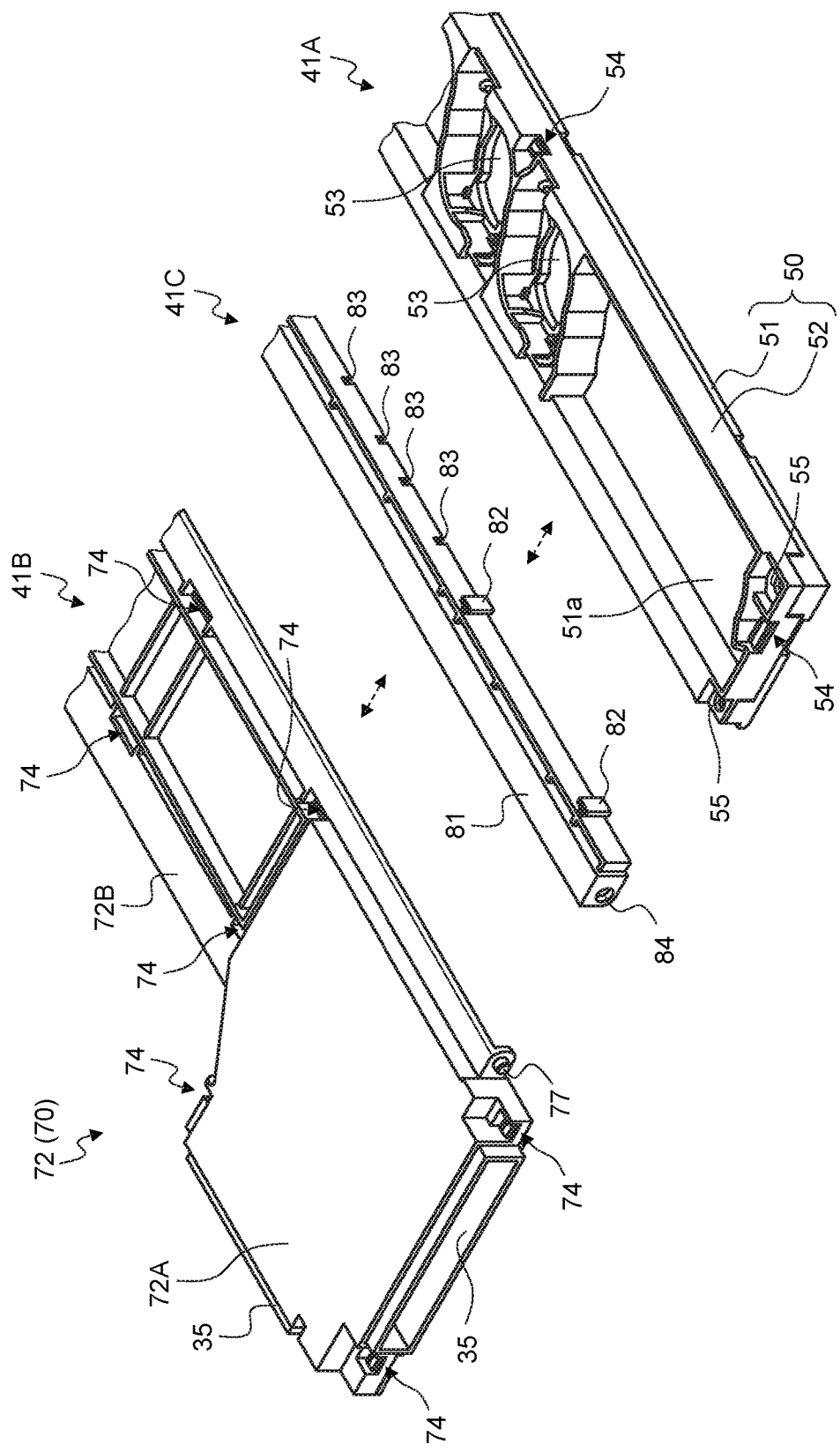
FIG. 9 is an exploded perspective view of the connector module.

More specifically, the exemplary connector module 40 is provided with a first electrical connection structure 41A having the electromagnetic valves 20 as counterpart electrical connection targets and a second electrical connection structure 41B having the control unit 30 as another counterpart electrical connection target (FIGS. 1 to 3, 8, and 9). The connector module 40 is further provided with a movable portion 41C capable of changing the relative positional relation between the first electrical connection structure 41A and the second electrical connection structure 41B. In FIG. 9, later-described electrical wires 42 are omitted for convenience.

The exemplary connector module 40 has the plurality of electrical wires 42 arranged across the first electrical connection structure 41A and the second electrical connection structure 41B. Two electrical wires 42 are arranged for each electromagnetic valve 20. Each of the electrical wires 42 has a first wiring portion 42a disposed in the first electrical connection structure 41A and a second wiring portion 42b disposed in the second electrical connection structure 41B (FIG. 8). The electrical wire 42 has a first electrical connection portion $42a_1$ directly or indirectly electrically connected to the corresponding electromagnetic valve 20 at an end (an end of the first wiring portion 42a). The electrical wire 42 further has a second electrical connection portion $42b_1$ directly or indirectly electrically connected to the control unit 30 at the other end (an end of the second wiring portion 42b).

The electrical wire 42 further has a connection portion 42c connecting the other end of the first wiring portion 42a and the other end of the second wiring portion 42b. The connection portion 42c serves as a movable electrical wire portion on the movable portion 41C and is sufficiently flexible to change its shape. Because of the flexibility, the connection portion 42c is capable of changing the relative positional relation between the first electrical connection structure 41A and the second electrical connection structure 41B. From this viewpoint, any electrical wire 42 is applicable as long as at least the connection portion 42c has flexibility after wiring.

For example, a single core wire or a twisted wire is used for the conductive body of the electrical wire 42, and an insulating coating is applied to the conductive body of the electrical wire 42. The connector module 40 may be disposed in a place soaked in the hydraulic oil of the automatic transmission, and the hydraulic oil is likely to flow inside the connector module 40. In this case, an insulating material durable to the properties (for example, the property of an additive and the oil temperature) of the hydraulic oil is used to form the coating. Because the exemplary connector module 40 is disposed in such a soaking place, the coating is formed from a material (such as synthetic resin) having an insulation property and durability to the properties of the hydraulic oil. For example, the electrical wire 42 has the whole of the conductive body covered by this kind of coating. In using this kind of coating, the coating is removed at both ends of the electrical wire 42 to have the conductive body inside thereof exposed, thereby forming the first electrical connection portion $42a_1$ and the second electrical connection portion $42b_1$. The exemplary electrical wire 42 is made by applying conductive plating to a single core wire and covering the wire with a fluorine-resin coating.

Figure 10:
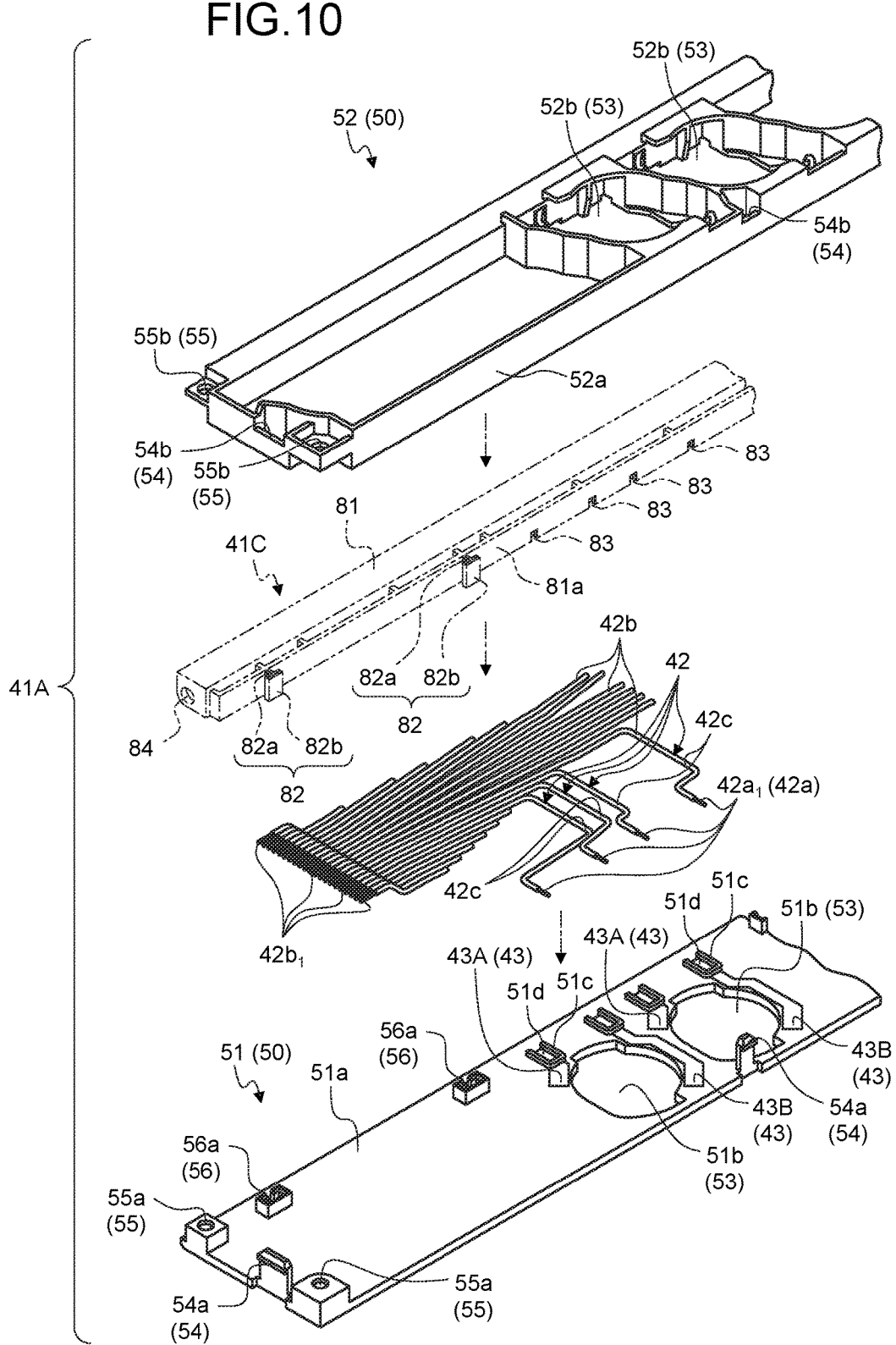
FIG. 10 is an exploded perspective view of a first electrical connection structure.
Figure 11:
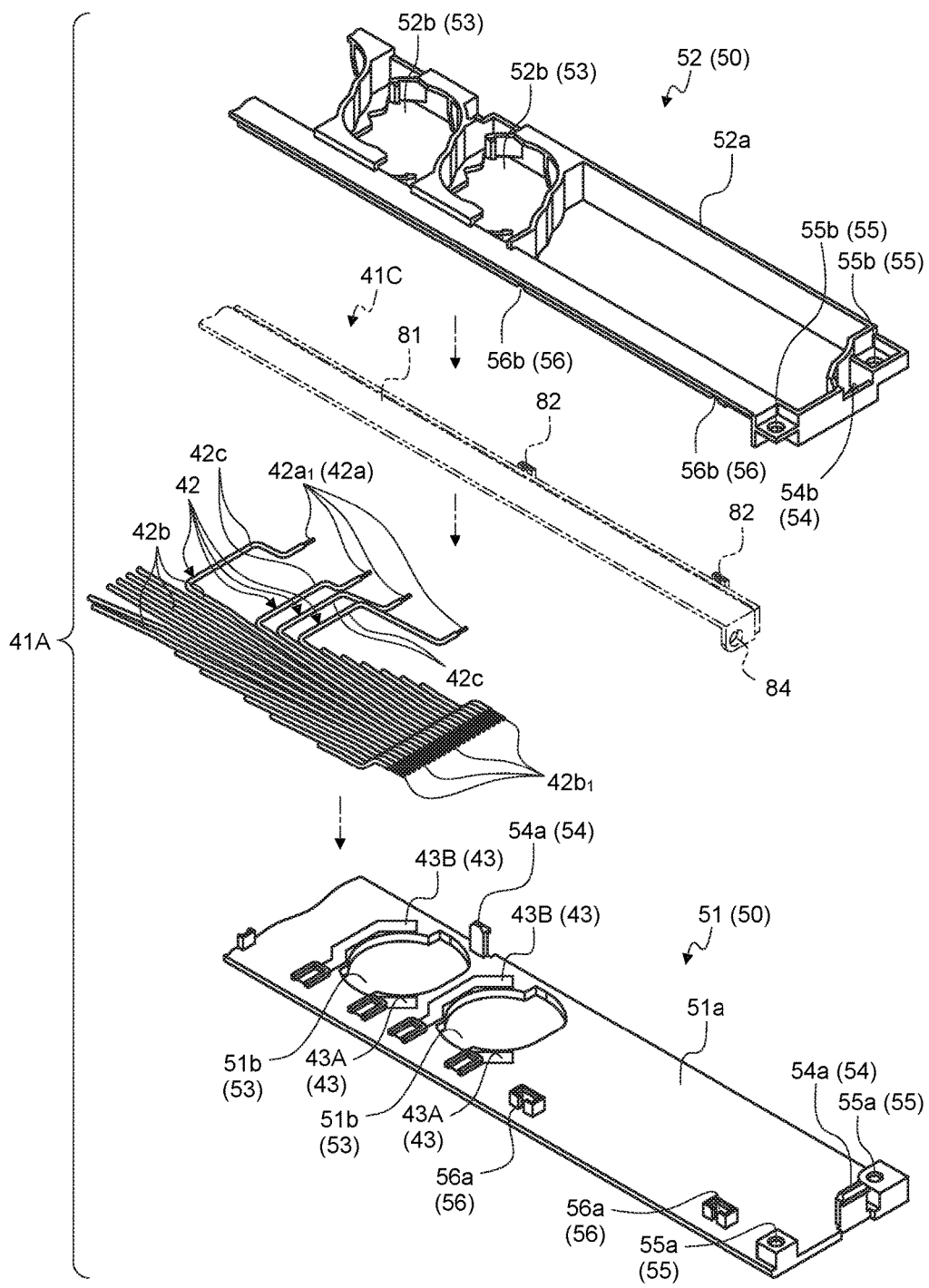
FIG. 11 is an exploded perspective view of the first electrical connection structure viewed from another angle.
Figure 12:
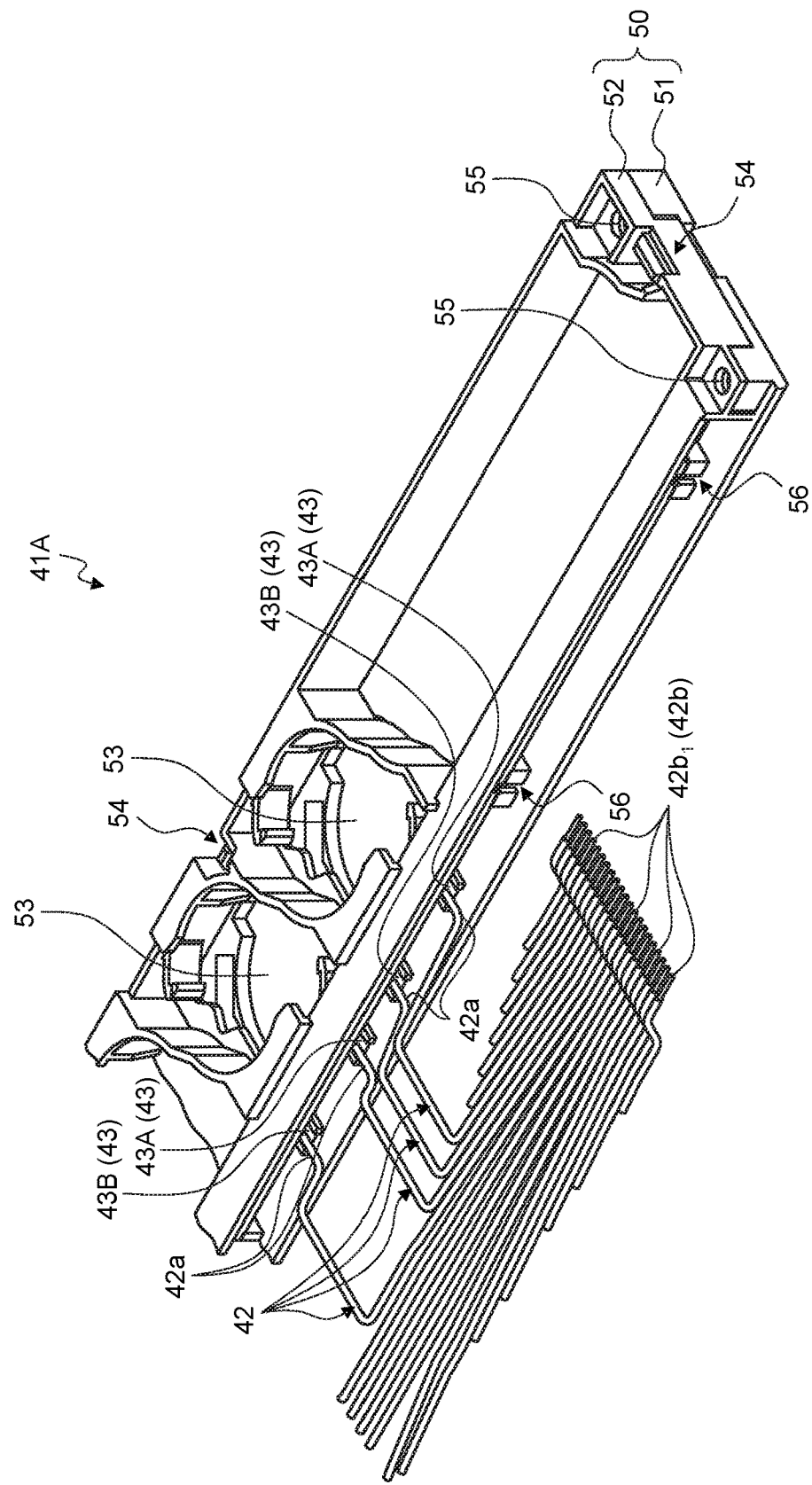
FIG. 12 is a perspective view of the first electrical connection structure.

The first electrical connection structure 41A will now be described. For the same reason as that for the coating on the electrical wire 42, the exemplary first electrical connection structure 41A has all the components formed from a material durable to the properties of the hydraulic oil. The exemplary first electrical connection structure 41A has the first wiring portions 42a and the first electrical connection portions $42a_1$ of the electrical wires 42 disposed thereon as described earlier. The first electrical connection structure 41A has the first electrical connection portions $42a_1$ indirectly electrically connected to the electromagnetic valves 20. The first electrical connection structure 41A is therefore provided with terminals 43 for electrically connecting the first electrical connection portions $42a_1$ and the electromagnetic valves 20 (FIGS. 10 to 12). Each of the terminals 43 serves as a counterpart electrical connection portion for the corresponding first electrical connection portion $42a_1$. In this example, the terminals 43 provide each of the electromagnetic valves 20 with a first terminal 43A and a second terminal 43B. The first terminals 43A and the second terminals 43B are formed from a conductive material such as metal as separate components from the electrical wire 42. The first electrical connection structure 41A has the terminals 43 (the first terminals 43A and the second terminals 43B) physically electrically connected to the first electrical connection portions $42a_1$ by a certain method. Any method is applicable as long as the first electrical connection portions $42a_1$ are physically electrically connected with the terminals 43. Examples of the method may include welding (laser welding, resistance welding, and the like), soldering, and pressure bonding. Each of the exemplary first terminals 43A and second terminals 43B is formed in a plate such as a bus bar. The first electrical connection portion $42a_1$ of each electrical wire 42 is welded to the planar end of the corresponding first terminal 43A or second terminal 43B (FIG. 12).

The first electrical connection structure 41A includes a first accommodation member 50 accommodating the first wiring portions 42a and the first electrical connection portions $42a_1$ of the electrical wires 42 and the terminals 43 (the first terminals 43A and the second terminals 43B) (FIGS. 8 to 12). The first electrical connection structure 41A uses a part of the first accommodation member 50 for a wiring plate. The first accommodation member 50 is assembled to the driving system placing unit 10A of the oil pressure circuit body 10 and is disposed in a manner covering at least the periphery of the accommodation space 13. The exemplary first accommodation member 50 is broadly divided into a base member 51 and a covering member 52 and integrates both members to form an insertion hole 53 for each electromagnetic valve 20. The electromagnetic valve 20 is accommodated in the accommodation space 13 through the insertion hole 53.

The base member 51 is a plate member having a main portion 51a formed in a plate (FIGS. 10 and 11) and is formed to cover at least the periphery of the accommodation spaces 13 at an planar end when placed on the driving system placing unit 10A. Through-holes 51b for exposing the accommodation spaces 13 with the base member 51 placed on the driving system placing unit 10A is formed on the main portion 51a of the base member 51. Each of the through-holes 51b serves as a part of the corresponding insertion hole 53 in the oil pressure circuit body 10 side of the first accommodation member 50.

The base member 51 may be formed from any material including a metal material, a synthetic resin material, and the like. The exemplary base member 51 is formed from an insulating material such as a synthetic resin and includes the first terminals 43A and the second terminals 43B with a planar end of each terminal exposed. In this example, the first terminals 43A, the second terminals 43B, and the base member 51 are integrated by the insert molding.

As described above, the first electrical connection portions $42a_1$ of the electrical wires 42 are welded to the exposed planar ends of the first terminals 43A and the second terminals 43B. With this configuration, in the first electrical connection structure 41A, the base member 51 serves as a wiring plate, on the inner wall surface of which the first wiring portions 42a of the electrical wires 42 are arranged. The base member 51 thus may be provided with retaining portions for retaining the arranged first wiring portions 42a. In this example, however, because the first wiring portions 42a each have a short path length and the respective first electrical connection portions $42a_1$ are physically connected to the first terminals 43A and the second terminals 43B, no retaining portions are provided.

The covering member 52 is assembled to the base member 51 and has a main portion 52a formed in such a manner that covers the base member 51 from the other planar side (FIGS. 10 and 11). The main portion 52a is provided with through-holes 52b having the accommodation spaces 13 exposed when the main portion 52a is assembled to the base member 51 and to the driving system placing unit 10A. The through-holes 52b with the through-holes 51b of the base member 51 form the insertion holes 53.

The covering member 52 may be formed from any material including a metal material, a synthetic resin material, and the like. As is the case with the base member 51, the exemplary covering member 52 is formed from an insulating material such as a synthetic resin material.

The first accommodation member 50 includes engagement mechanisms 54 disposed respective positions for integrating the base member 51 and the covering member 52 (FIGS. 9 to 11). Each of the engagement mechanisms 54 includes a first engagement portion 54a formed on the main portion 51a of the base member 51 and a second engagement portion 54b formed on the main portion 52a of the covering member 52 and integrating the base member 51 and the covering member 52 by being engaged with the first engagement portion 54a. As an exemplary configuration of the engagement mechanism 54, one of the first engagement portion 54a and the second engagement portion 54b is formed as a claw portion, and the other one has a wall surface to which the claw portion is hooked. In this example, the first engagement portion 54a is formed as a claw portion, and the second engagement portion 54b has a wall surface to which the claw portion is hooked.

For integration of the base member 51 and the covering member 52 in the first accommodation member 50, the first wiring portions 42a of the electrical wires 42 are first arranged on the base member 51. In the wire arrangement process, ends of the electrical wires 42 are cut to make the first wiring portions 42a in a length of a designed value. The first electrical connection portions $42a_1$ are thereafter formed by removing the coating on the ends of the first wiring portions 42a. This exemplary configuration has the ends of the electrical wires 42 cut and the coating on the first wiring portions 42a removed after arrangement of the electrical wires 42. The base member 51 is therefore formed in a shape adaptable to such jigs for cutting and removing. For example, a notch may be formed on the base member 51.

In the next processing, the first electrical connection portions $42a_1$ are welded to the terminals 43 (the first terminals 43A and the second terminals 43B). Furthermore, the base member 51 and the covering member 52 are integrated through the engagement mechanisms 54 with a part of a later-described connection member 81 of the movable portion 41C sandwiched between the base member 51 and the covering member 52. The first accommodation member 50 is connected with the connection member 81 in the process of integration of the base member 51 and the covering member 52. The connection structure will be later described.

The physical electrical connection part (hereinafter simply referred to as a "connection part") between the first electrical connection portion $42a_1$ of the electrical wire 42 and a counterpart unit (the first terminal 43A and the second terminal 43B) may be covered by an insulating member as is the case of the connection part between later-described second electrical connection portions $42b_1$ and a counterpart unit (terminals 31 of the control unit 30). If the connection parts are arranged next to each other with a short distance, it is preferable that the connection parts be covered by an insulating member to prevent electrical connection with conductive dust (contamination) contained in the hydraulic oil. This configuration allows the connector module 40 to maintain electrical connection between electrical connection targets (between the electromagnetic valve 20 and the control unit 30) even when the hydraulic oil contaminated by conductive dust flows into the connector module 40, thereby improving durability of the connector module 40 and the electrical connection targets. In the first accommodation member 50, for example, when the connection member 81 is assembled to the base member 51, U-shaped wall portions 51c of the base member 51 and a wall portion 81a of the connection member 81 form rectangular parallelepiped spaces (concave portions with their periphery surrounded) 51d (FIG. 10). Each of the wall portion 51c is vertically formed in such a manner that surrounds a portion in the exposed portion of the corresponding terminal 43 (the first terminal 43A or the second terminal 43B) welded to the corresponding first electrical connection portion $42a_1$. From another point of view, each of the first electrical connection portions $42a_1$ and each of the terminals 43 are arranged in the corresponding space 51d and formed such that the physical electrical connection part therebetween is accommodated in the space 51d. Each of the wall portions 51c is vertically arranged at each connection part between the corresponding first electrical connection portion 42a: and a counterpart unit (the first terminal 43A or the second terminal 43B). Each of the spaces 51d is arranged at the corresponding connection part and accommodates therein the connection part. In this configuration, by putting a liquid or gelled insulating synthetic resin material into the space 51d and solidifying the material, an insulating member covering the connection part can be formed in the space 51d. Furthermore, the space 51d can prevent outflow of the put synthetic resin material.

The integrated first accommodation member 50 is fixed to the driving system placing unit 10A of the oil pressure circuit body 10 with screw members (not illustrated) or the like. The exemplary first accommodation member 50 is provided with through-holes 55 into which respective male screw members are inserted (FIGS. 9 to 11). Each of the through-holes 55 is configured with a through-hole 55a provided to the main portion 51a of the base member 51 and a through-hole 55b provided to the main portion 52a of the covering member 52. Female screw portions (not illustrated) to which the respective male screw members are screwed are provided to the driving system placing unit 10A.

The first accommodation member 50 may have a connection structure for the electromagnetic valve 20 or may have no connection structures for the electromagnetic valve 20. In this example, the oil pressure circuit body 10 and the first accommodation member 50 each have connection structures for the electromagnetic valve 20. The connection structure for the electromagnetic valve 20 will now be briefly described.

The connection structure for the exemplary electromagnetic valve 20 includes at least two first connection structural bodies 61 (FIGS. 4 to 7), a second connection structural body 62 (FIGS. 4 to 7), and at least two third connection structural bodies 63 (FIGS. 6, 7, and 13) for each electromagnetic valve 20.

Each of the first connection structural bodies 61 includes first connected pieces 61A (FIGS. 6 and 7) provided to the accommodation body 23 and first connecting pieces 61B (FIGS. 4 and 5) formed on the wall portion (an inner peripheral wall portion 13b) configuring the accommodation space 13 and locking the first connected pieces 61A in the axial direction (the axial direction of the accommodation space 13 and the accommodation body 23) when the accommodation body 23 is accommodated in the accommodation space 13. In this example, two first connection structural bodies 61 are arranged around the axis at substantially regular intervals.

When the electromagnetic valve 20 is installed to the oil pressure circuit body 10, the electromagnetic valve 20 has the accommodation body 23 inserted into the accommodation space 13 along the axial direction of the center axis (the center axis of the accommodation body 23). When the front end surface 23a of the accommodation body 23 contacts with the bottom 13a of the accommodation space 13, the electromagnetic valve 20 is overall rotated around the center axis. In this configuration, each of the first connected pieces 61A is formed as a projecting portion partially projected radially outward from the outer peripheral wall portion of the accommodation body 23. Each of the first connecting pieces 61B is formed as a groove portion that guides the corresponding first connected piece 61A in response to the accommodation operation of the accommodation body 23 into the accommodation space 13 and locks the first connected piece 61A in the axial direction (the axial direction of the accommodation space 13 and the accommodation body 23) after the rotating operation of the accommodation body 23 around the center axis (the center axis of the accommodation body 23) in the process of the accommodation operation of the accommodation body 23. The first connecting piece 61B is formed in a groove shape by concaving a part of the wall portion (the inner peripheral wall portion 13b) of the accommodation space 13 radially outward.

More specifically, each of the first connecting pieces 61B has an axial direction groove portion $61B_1$ and a circumferential direction groove portion $61B_2$. The axial direction groove portion $61B_1$ is a groove for guiding the corresponding first connected piece 61A in the axial direction when the accommodation body 23 is inserted into the accommodation space 13 along the axial direction. The axial direction groove portion $61B_1$ is extended from the outer wall surface side of the oil pressure circuit body 10 to the level of the bottom 13a of the accommodation space 13 along the axial direction. The circumferential direction groove portion $61B_2$ is a groove for guiding the corresponding first connected piece 61A in the circumferential direction when the accommodation body 23 is rotated around the center axis in the accommodation space 13. The circumferential direction groove portion $61B_2$ is extended from the bottom 13a side of the axial direction groove portion $61B_1$ in the circumferential direction. The circumferential direction groove portion $61B_2$ has a side wall $61B_3$ positioned opposite to the bottom 13a side in the axial direction and locks a relative movement of the corresponding first connected piece 61A in the axial direction using the bottom 13a and the side wall $61B_3$. With this configuration, the first connection structural body 61 can prevent the electromagnetic valve 20 from relatively moving in the axial direction with respect to the oil pressure circuit body 10.

The second connection structural body 62 includes a second connected piece 62A (FIGS. 6 and 7) provided to the accommodation body 23 and a second connecting piece 62B (FIGS. 4 and 5) formed on the wall portion (the inner peripheral wall portion 13b) configuring the accommodation space 13 and preventing the second connected piece 62A from relatively moving along the plane perpendicular to the axial direction (the axial direction of the accommodation space 13 and the accommodation body 23) when the accommodation body 23 is accommodated in the accommodation space 13.

In this example, an outer peripheral wall portion 23b of the first accommodation body 23A is used as the second connected piece 62A, and the inner peripheral wall portion 13b of the accommodation space 13 is used as the second connecting piece 62B. In the second connection structural body 62, the outer peripheral wall portion 23b (the second connected piece 62A) and the inner peripheral wall portion 13b (the second connecting piece 62B) having the same outer diameters are mated with each other without causing a backlash therebetween. This configuration can prevent a relative movement of the accommodation body 23 in the accommodation space 13 in a direction perpendicular to the axial direction. In this manner, the second connection structural body 62 can prevent a relative movement of the electromagnetic valve 20 with respect to the oil pressure circuit body 10 in the direction perpendicular to the axial direction.

Each of the third connection structural bodies 63 includes third connected pieces 63A (FIGS. 2, 6, and 7) provided to the accommodation body 23 and third connecting pieces 63B (FIGS. 2 and 13) formed on the covering member 52 of the first accommodation member 50 and preventing the electromagnetic valve 20 from relatively rotating around the center axis with respect to the oil pressure circuit body 10 by locking the third connected pieces 63A when the accommodation body 23 is accommodated in the accommodation space 13.

Figure 13:
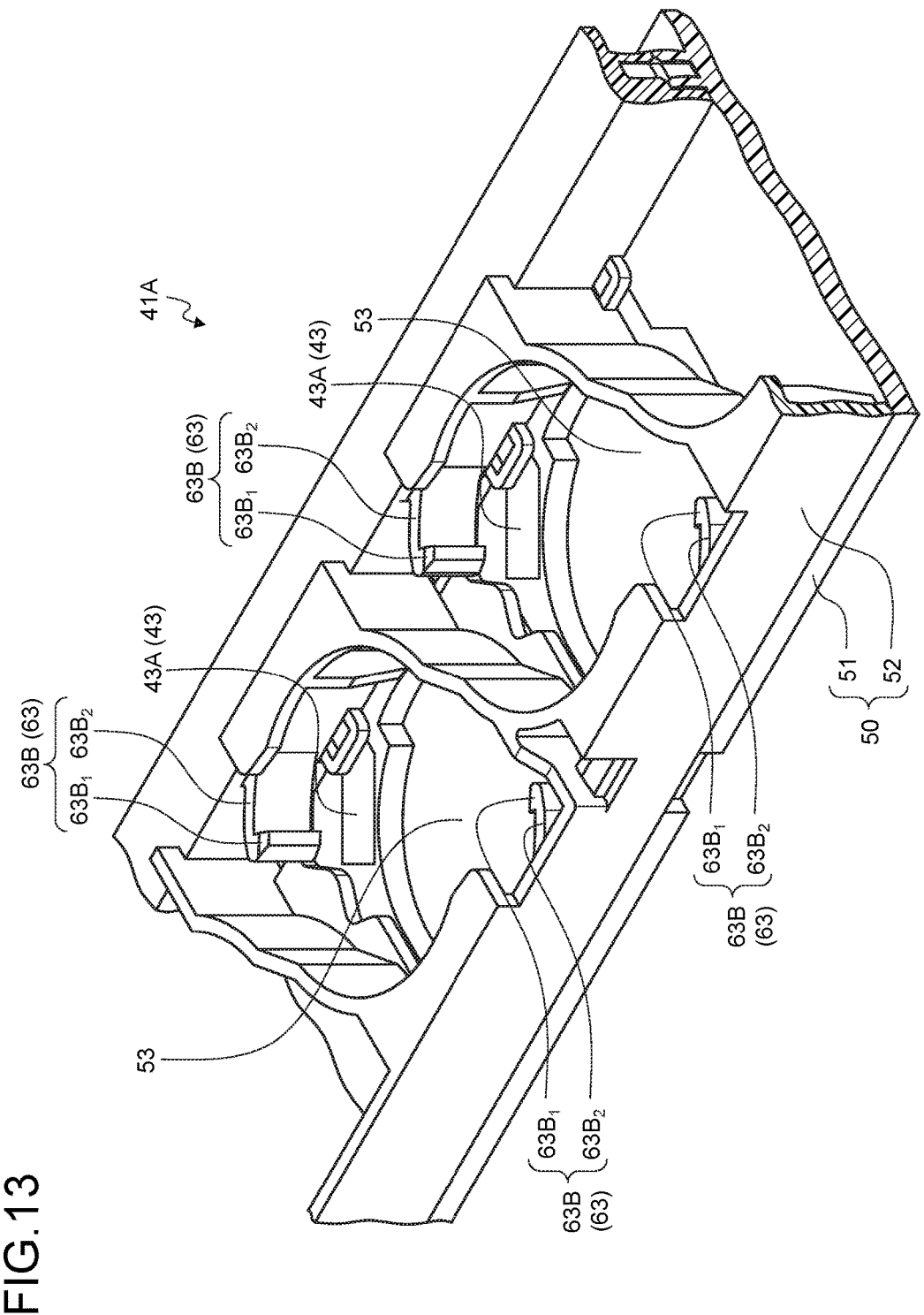
FIG. 13 is a perspective view of the first electrical connection structure and is an illustrative view of the connection structure of the electromagnetic valve.

Each of the third connected pieces 63A is formed as a projecting portion partially projected radially outward from the outer peripheral wall portion of the accommodation body 23. Each of the third connecting pieces 63B is formed as a locking portion that locks the corresponding third connected piece 63A by being pushed by the third connected piece 63A in the earlier-described rotating operation of the accommodation body 23 and accordingly stops the rotating operation. The third connecting piece 63B is projected radially inward from the wall portion (the inner wall portion) of the insertion hole 53 for the electromagnetic valve 20. The third connecting piece 63B has claw portions $63B_1$ pushed and climbed by the third connected pieces 63A in the rotating operation of the accommodation body 23 and connection portions $63B_2$ connecting the claw portions $63B_1$ to the wall portion (the inner wall portion) of the insertion hole 53 (FIG. 13). It is preferable that the connection portions $63B_2$ be formed in a flexible manner so as to apply pressure to the third connected pieces 63A when the third connected pieces 63A climb over the claw portions $63B_1$ while pushing the claw portions $63B_1$. With this configuration, the third connection structural body 63 can prevent the electromagnetic valve 20 from relatively rotating around the axis with respect to the oil pressure circuit body 10.

The electromagnetic valve 20 is installed to the first electrical connection structure 41A and the oil pressure circuit body 10 through the first connection structural bodies 61, the second connection structural body 62, and the third connection structural bodies 63. When the electromagnetic valve 20 is relatively rotated around the axis with respect to the oil pressure circuit body 10 in the installation process, the valve-side connection parts 24a of the terminals 24 contact with the respective terminals 43 (the first terminal 43A and the second terminal 43B). In this manner, the connector module 40 has the electromagnetic valve 20 and each terminal 43 physically electrically connected to each other.

Figure 14:
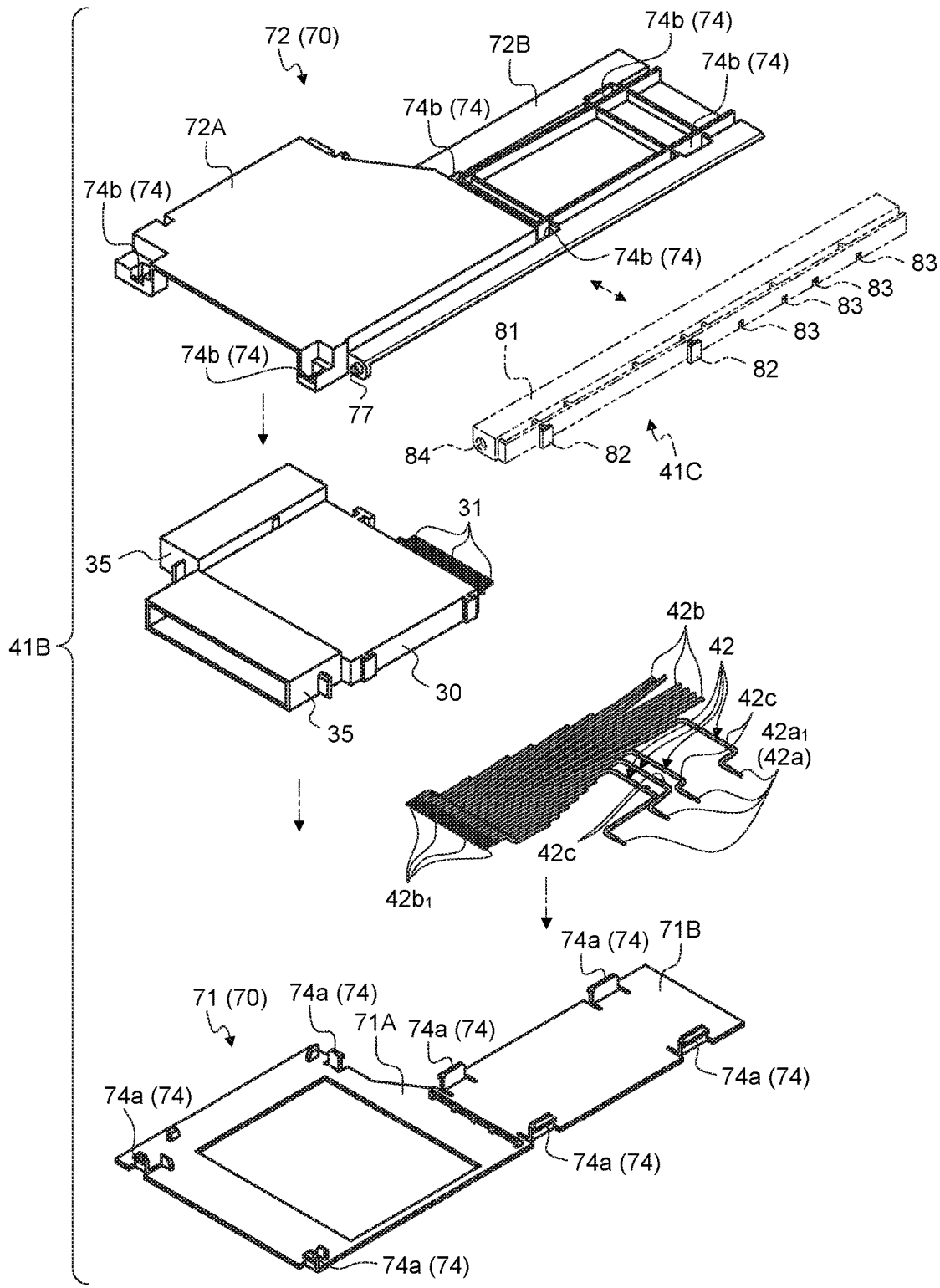
FIG. 14 is an exploded perspective view of a second electrical connection structure.

The second electrical connection structure 41B will now be described. For the same reason as that for the coating on the electrical wire 42, the exemplary second electrical connection structure 41B has all the components formed from a material durable to the properties of the hydraulic oil. The exemplary second electrical connection structure 41B has the second wiring portions 42b and the second electrical connection portions $42b_1$ of the electrical wires 42 disposed thereon as described earlier. The second electrical connection structure 41B is provided with a second accommodation member 70 for accommodating the second wiring portions 42b and the second electrical connection portions $42b_1$ (FIG. 14). The second accommodation member 70 is mounted on the control system placing unit 10B of the oil pressure circuit body 10. The exemplary second accommodation member 70 is broadly divided into a base member 71 and a covering member 72. The second accommodation member 70 further has an accommodation room for the control unit 30.

The base member 71 is a plate member formed in a plate and is placed on the control system placing unit 10B from a planar side. The base member 71 is broadly divided into a first accommodation portion 71A configuring a part of the accommodation room for the control unit 30 and a second accommodation portion 71B configuring a part of an accommodation room for the second wiring portions 42b. The first accommodation portion 71A and the second accommodation portion 71B may be integrated as a single unit or separately formed. The exemplary base member 71 is an integral molded product of the first accommodation portion 71A and the second accommodation portion 71B. The base member 71 is formed from an insulating material such as a synthetic resin material.

The covering member 72 is assembled to the base member 71 and is formed in such a manner that covers the base member 71 from the other planar side. The exemplary covering member 72 serves as a wiring plate for having the second wiring portions 42b arranged thereon and is formed from an insulating material such as a synthetic resin material. The covering member 72 is broadly divided into a first accommodation portion 72A configuring a part of the accommodation room for the control unit 30 and a second accommodation portion 72B configuring a part of an accommodation room for the second wiring portions 42b. The first accommodation portion 72A and the second accommodation portion 72B may be integrated as a single component or separately formed. The exemplary covering member 72 is configured with the separately formed components and specifically configured with a first covering member (hereinafter referred to as a "first covering member 72A") serving as the first accommodation portion 72A and a second covering member (hereinafter referred to as a "second covering member 72B") serving as the second accommodation portion 72B. The first covering member 72A of the covering member 72 covers the first accommodation portion 71A of the base member 71, which forms an inner space used as the accommodation room for the control unit 30. The second covering member 72B of the covering member 72 covers the second accommodation portion 71B of the base member 71, which forms an inner space used as the accommodation room for the second wiring portions 42b.

Figure 15:
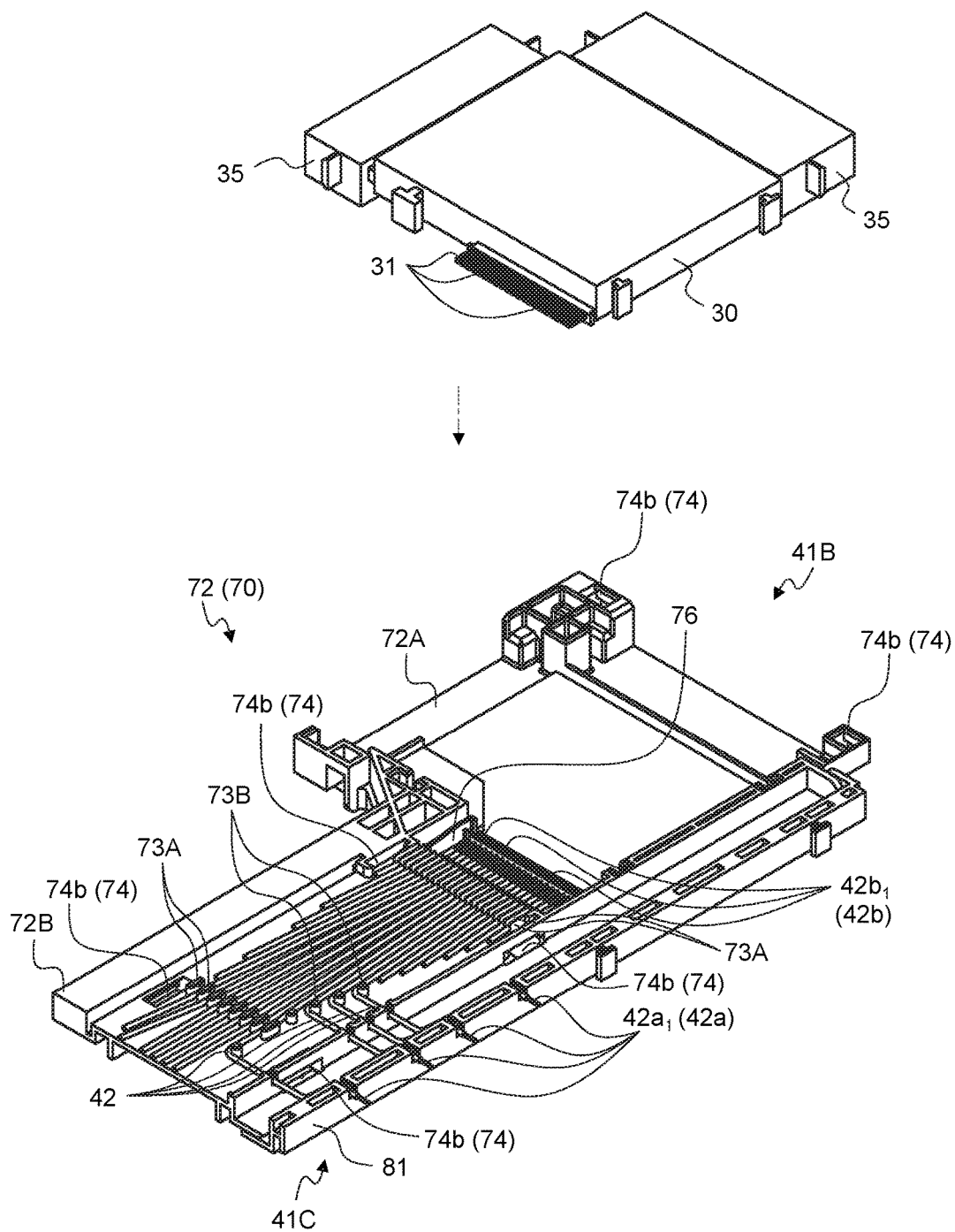
FIG. 15 is a perspective view of an inside structure of the second electrical connection structure.
Figure 16:
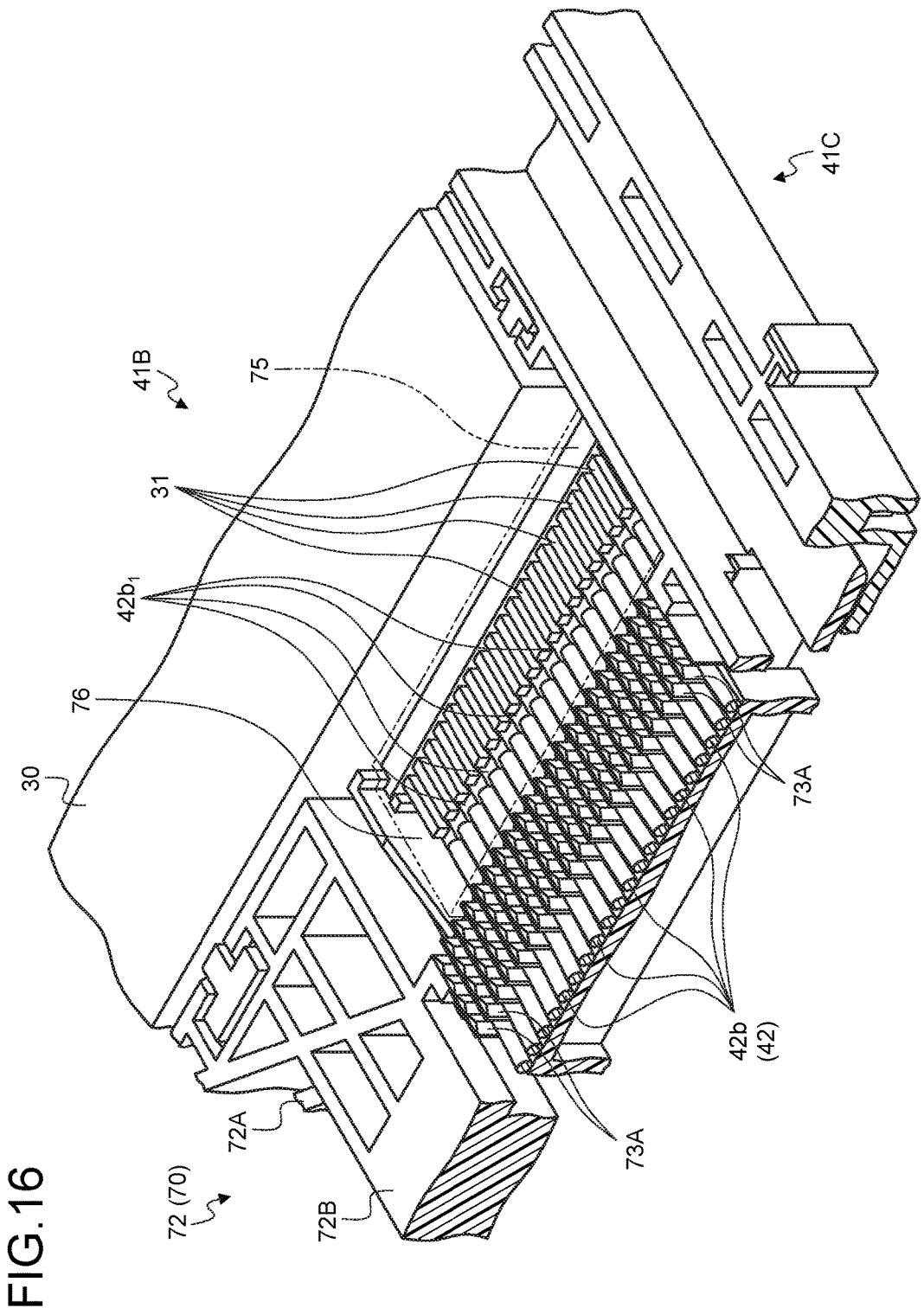
FIG. 16 is an illustrative view of an insulating member in the second electrical connection structure.
Figure 17:
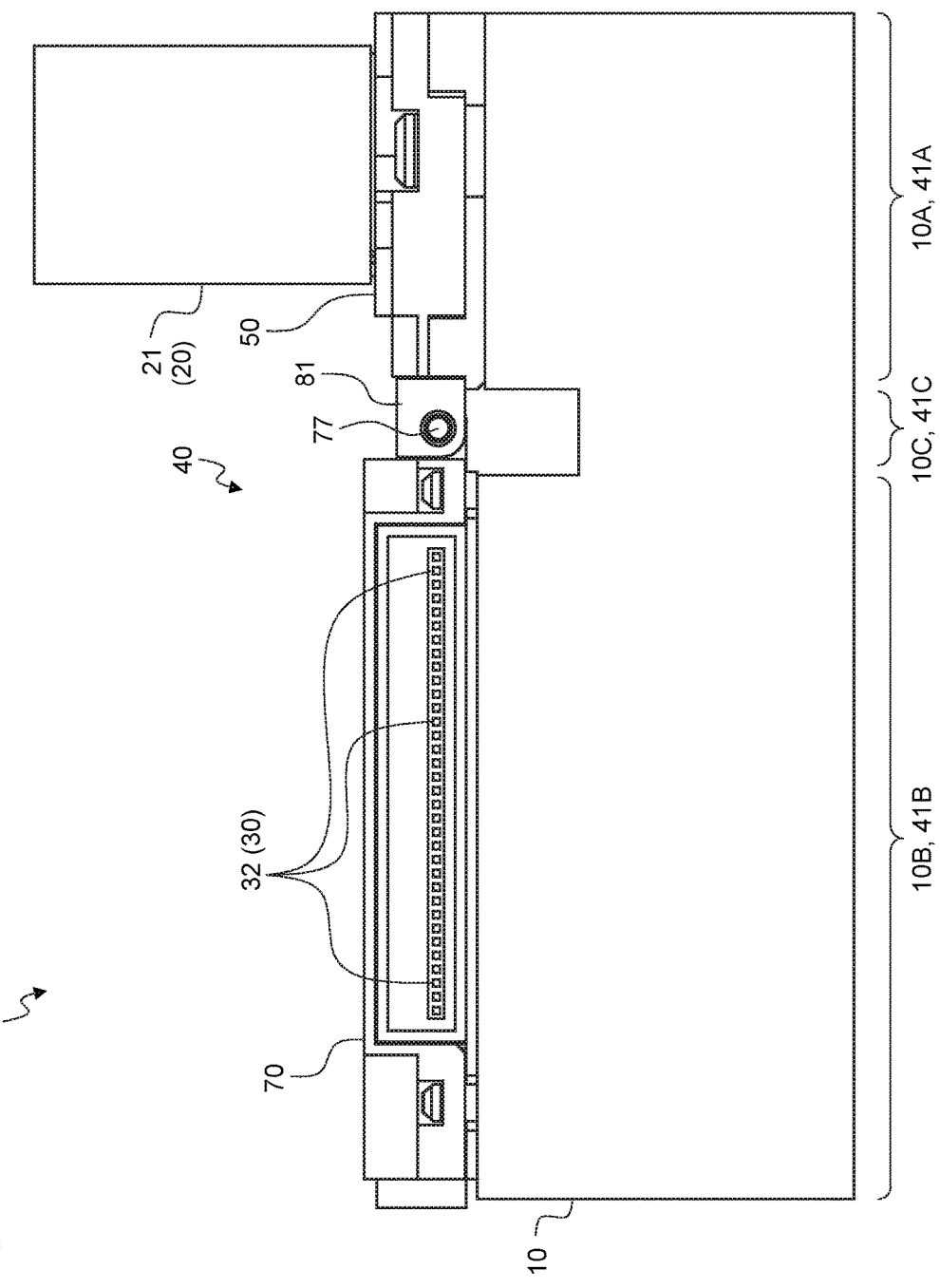
FIG. 17 is a view of the connector module applied to a type of oil pressure circuit body (hydraulic pressure circuit body)
Figure 18:
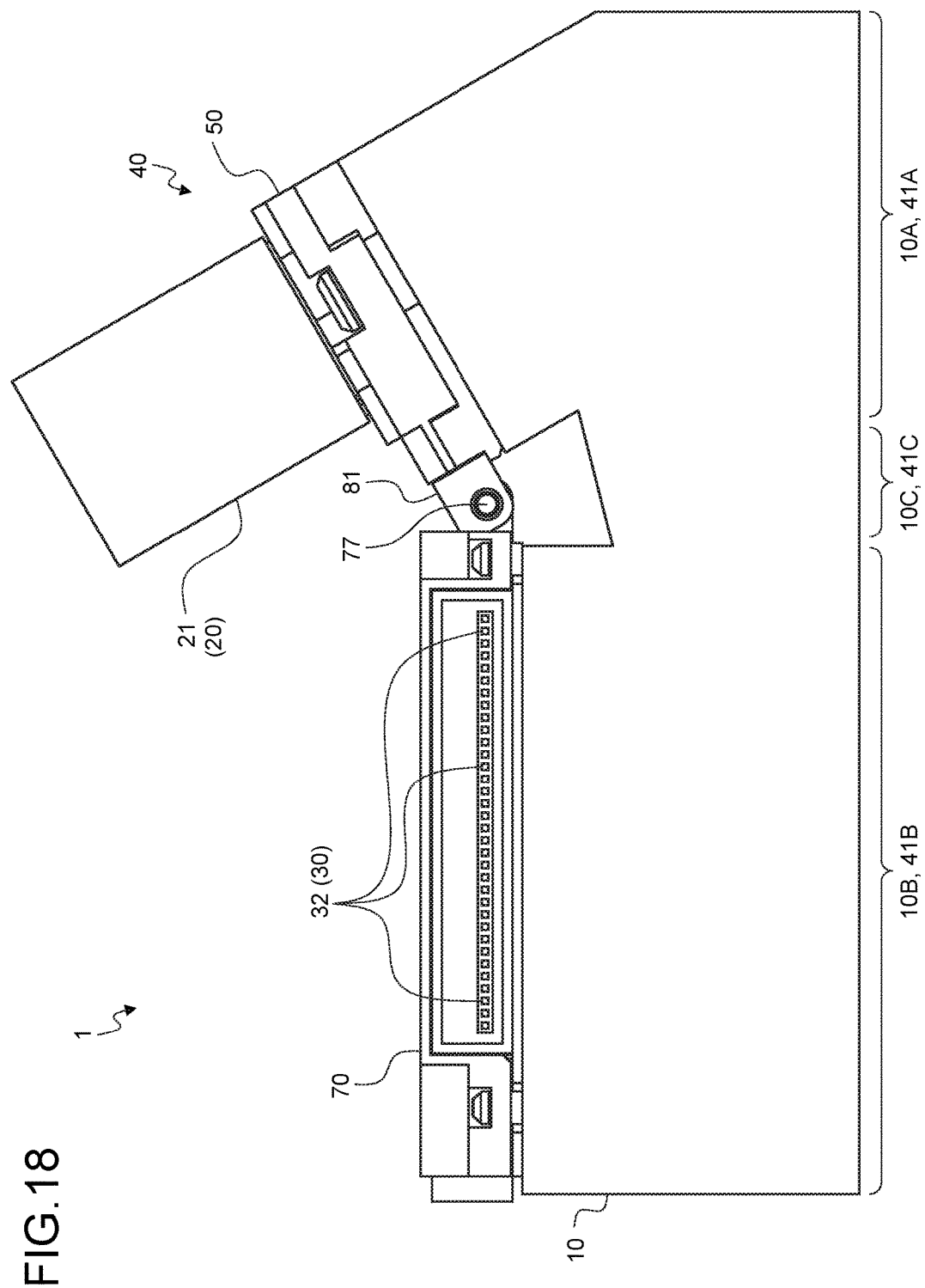
FIG. 18 is a view of the connector module applied to another type of oil pressure circuit body (hydraulic pressure circuit body)
Figure 19:
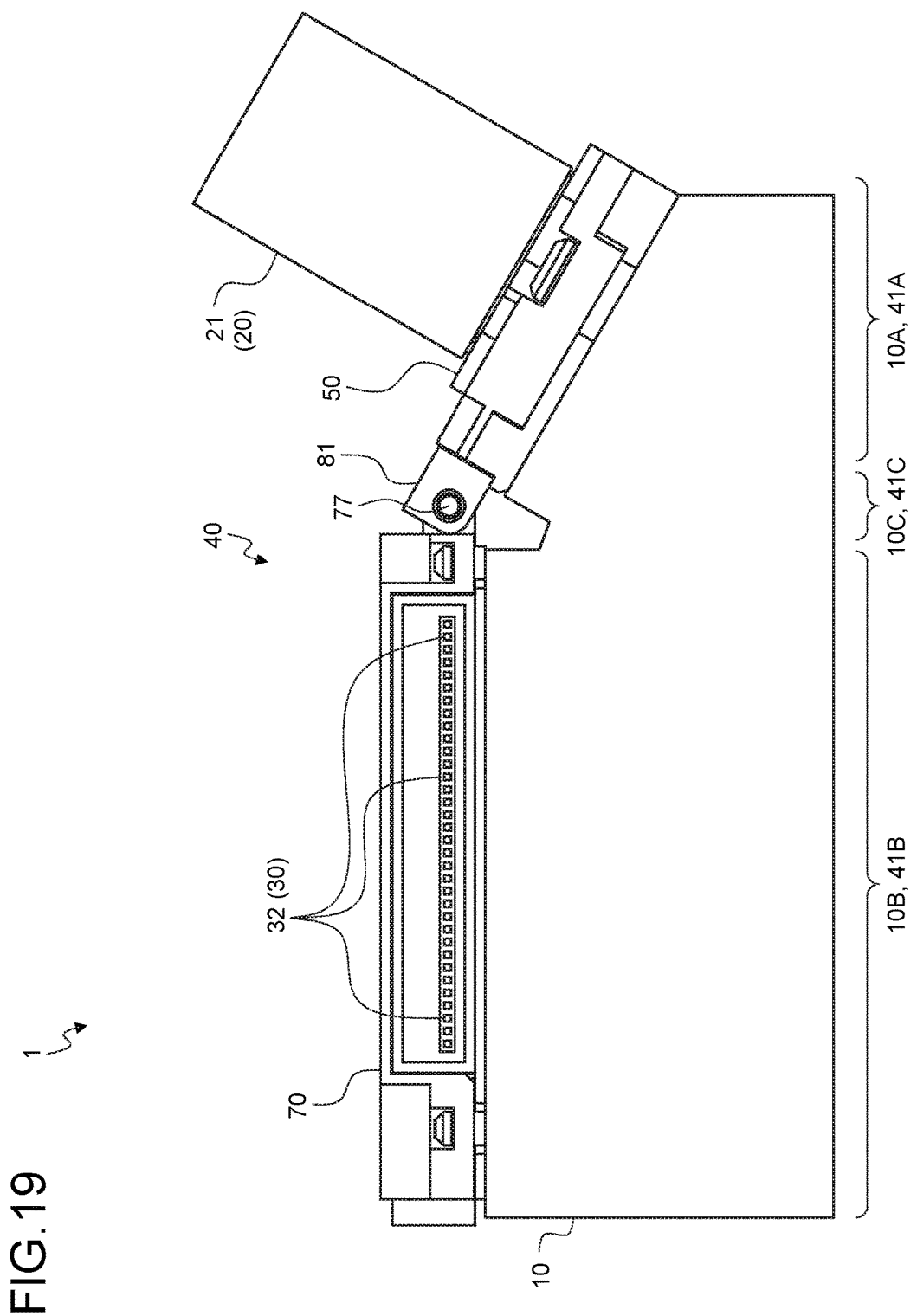
FIG. 19 is a view of the connector module applied to still another type of oil pressure circuit body (hydraulic pressure circuit body)
Figure 20:
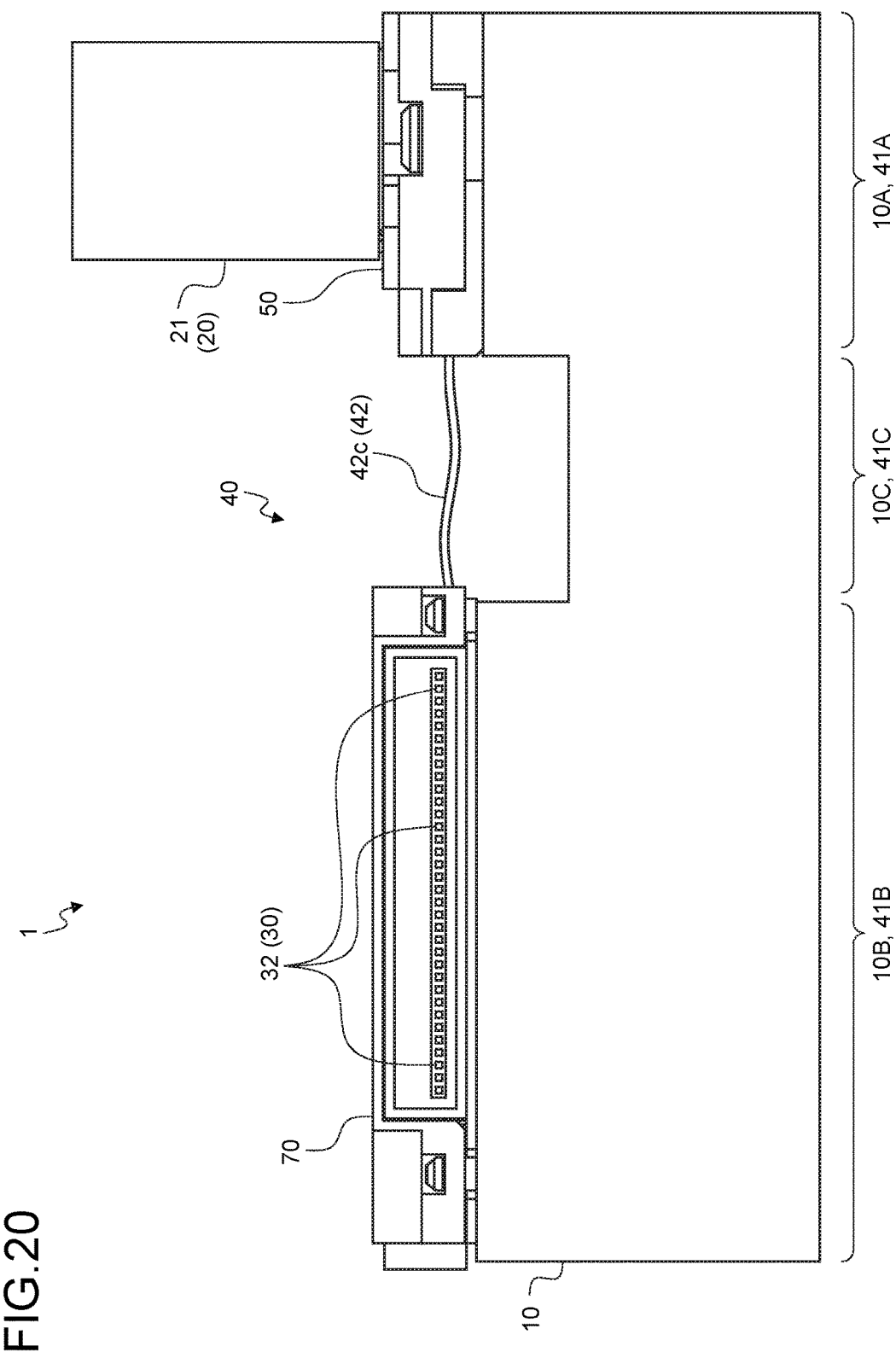
FIG. 20 is a view of the connector module applied to still another type of oil pressure circuit body (hydraulic pressure circuit body)

In the accommodation room for the second wiring portions 42b, the second wiring portions 42b are arranged on the inner surface wall of the second covering member 72B (FIG. 15). The inner wall surface of the second accommodation portion 72B is provided with retaining portions 73A for retaining the respective second wiring portions 42b and bend guiding portions 73B for defining bent portions of the respective second wiring portions 42b. For example, the retaining portions 73A are bodies vertically formed to retain the second wiring portions 42b in a manner clipping the second wiring portions 42b and are arranged in a position or in a plurality of positions depending on the path length of the second wiring portions 42b (FIGS. 15 and 16). The bend guiding portions 73B are cylindrical bodies vertically formed at the bent portions of the second wiring portions 42b and guide the second wiring portions 42b while bending the second wiring portions 42b along the circumferential directions of the cylindrical bodies.

Engagement mechanisms 74 for integrating the base member 71 and the covering member 72 are provided at respective positions on the second accommodation member 70 (FIGS. 14 and 15). Each of the engagement mechanisms 74 has a first engagement portion 74a provided to the base member 71 and a second engagement portion 74b provided to the covering member 72 and integrating the base member 71 and the covering member 72 by being engaged with the first engagement portion 74a. The exemplary engagement mechanisms 74 are similar to the engagement mechanisms 54 of the first accommodation member 50. Each of the engagement mechanism 74 forms the first engagement portion 74a as a claw portion and forms a wall surface for having the claw portion hooked on the second engagement portion 74b.

The second electrical connection structure 41B has the second electrical connection portions $42b_1$ directly electrically connected to the control unit 30. In this example, the second electrical connection portions $42b_1$ are provided for the terminals 31 of the control unit 30. Each of the terminals 31 serves as a counterpart electrical connection portion to the corresponding second electrical connection portion $42b_1$.

In integrating the base member 71 and the covering member 72, the second accommodation member 70 has the second wiring portions 42b of the electrical wires 42 arranged on the second covering member 72B along the earlier-described retaining portions 73A and the bend guiding portions 73B. In the wire arrangement process, ends of the electrical wires 42 are cut to make the second wiring portions 42b in a length of a designed value. The second electrical connection portions $42b_1$ are thereafter formed by removing the coating on the ends of the second wiring portions 42b. This exemplary configuration has the ends of the electrical wires 42 cut and the coating on the second wiring portions 42b removed after arrangement of the electrical wires 42. The second covering member 72B is thus formed in a shape adaptable to such jigs for cutting and removing. For example, a notch may be formed on the second covering member 72B.

In the next processing, the first covering member 72A is placed on the control unit 30 (in this process, connectors 35 of the control unit 30 may be already installed to the control unit 30 or may be installed in the later process), and the second electrical connection portions $42b_1$ and the terminals 31 of the control unit 30 are welded to each other (FIG. 16). In this case, the welded exposed second electrical connection portions $42b_1$ and the substantially whole part of the terminals 31 each serve as a physical electrical connection part. In the next processing, the base member 71 and the covering member 72 are integrated through the engagement mechanisms 74.

In the connector module 40, the second electrical connection structure 41B sets a small pitch between the connection parts next to each other. Moreover, a hydraulic oil of the automatic transmission containing conductive dust (that is, contamination) such as metal powder is likely to flow inside the connector module 40. In the connector module 40, each connection part is thus covered by an insulating member 75 to prevent electrical connection between the connection part and dust. This configuration allows the connector module 40 to maintain electrical connection between electrical connection targets (between the electromagnetic valves 20 and the control unit 30) even when the hydraulic oil contaminated by conductive dust flows into the connector module 40, thereby improving durability of the connector module 40 and the electrical connection targets.

For example, in the connector module 40, each connection part is covered by the insulating member 75 by putting a liquid or gelled insulating synthetic resin material into the connection part and its peripheral area and solidifying the material. For preventing outflow of the synthetic resin material before solidification, a concave portion 76 is formed in the inner wall surface side of the first covering member 72A as illustrated in FIG. 16. The concave portion 76 is a concave portion with its periphery surrounded. The exemplary concave portion 76 is formed deeper than the inner wall surface (the wiring surface) of the second covering member 72B where the second wiring portions 42b of the electrical wires 42 are arranged. All the connection parts are accommodated in the concave portion 76. For creating such an accommodation state, each second electrical connection portion $42b_1$ and the corresponding terminal 31 are disposed in the concave portion 76, and specifically, the physical electrical connection part therebetween is accommodated in the concave portion 76. In this example, the second electrical connection portions $42b_1$ are bent in a stepwise manner and offset with respect to the second wiring portions 42b such that the second electrical connection portions $42b_1$ are disposed in the concave portion 76. In the connector module 40, this configuration allows the connection parts to be formed in the concave portion 76, and each connection part is covered by the insulating member 75 in a manner separated from each other by putting a synthetic resin material into the concave portion 76. In this manner, the connector module 40 has the insulating member 75 formed in the concave portion 76, thereby assuring insulation between the respective connection parts next to each other.

The offset shape of the second wiring portions 42b may be formed before wire arrangement of the second wiring portions 42b or after the arrangement. In this case, for example, the second wiring portions 42b are arranged on the second covering member 72B with the second electrical connection portions $42b_1$ side longer than a designed value and are conveyed to the next pressing process. In the pressing process, a pressing machine presses the second electrical connection portions $42b_1$ of the second wiring portions 42b into the concave portion 76 and forms the offset shape of the second wiring portions 42b. In this pressing process, the second electrical connection portions $42b_1$ side of the second wiring portions 42b may be cut to a length of a designed value when the offset shape is formed. In this case, after the length in the second electrical connection portions $42b_1$ side is adjusted to the designed value, the second electrical connection portions $42b_1$ are formed by removing the coating on ends of the second wiring portions 42b in the next process.

This example has been described with all the connection parts arranged inside the rectangular parallelepiped insulating member 75 separately from each other at some intervals. The insulating member 75, however, may separately cover each connection part. In another case, in the connector module 40, an insulating member serving as a wall may be arranged between the connection parts next to each other.

The movable portion 41C will now be described. The movable portion 41C is provided with the connection member 81 for connecting the first electrical connection structure 41A and the second electrical connection structure 41B disposed next to each other. The connection member 81 connects the first electrical connection structure 41A and the second electrical connection structure 41B in such a manner that the relative positional relation therebetween can be changed.

More specifically, the connection member 81 is extended along the gap between the first electrical connection structure 41A and the second electrical connection structure 41B disposed next to each other (FIGS. 1 to 3, 8, and 9). For example, the connection member 81 is formed from a material (such as synthetic resin) having an insulation property and durability to the properties of the hydraulic oil for the same reason as that for the coating of the electrical wires 42.

The connection structure between the connection member 81 and the first electrical connection structure 41A will now be described. The connection member 81 has connection units 82 for connecting the connection member 81 and the first accommodation member 50, the connection units 82 being formed on the wall portion 81a facing the first accommodation member 50 (FIGS. 9 to 11). Each of the exemplary connection units 82 is a T-shaped projecting body configured with a rectangular first piece 82a projected from the wall portion 81a toward the first accommodation member 50 and a second piece 82b formed at a free end of the first piece 82a (FIG. 10).

The first accommodation member 50 is provided with locking bodies 56 for accommodating and locking the respective connection units 82 (FIGS. 10 to 12). For example, each of the locking bodies 56 has a notch for having the corresponding first piece 82a of the connection unit 82 inserted therein and an inner space for accommodating and locking the corresponding second piece 82b of the connection unit 82. In this example, the locking body 56 is divided into a first locking unit 56a provided to the base member 51 and a second locking unit 56b provided to the covering member 52 such that the locking body 56 is formed when the base member 51 and the covering member 52 are assembled to each other. Each of the first locking unit 56a and the second locking unit 56b accommodates and locks a half portion of the corresponding T-shaped connection unit 82 and specifically has a notch for having a half portion of the first piece 82a inserted therein and an inner space for accommodating and locking a half portion of the second piece 82b.

In the first electrical connection structure 41A, each of the T-shaped connection units 82 is accommodated in the corresponding first locking unit 56a and second locking unit 56b in the assembly process of the base member 51 and the covering member 52, and the locking body 56 is accordingly formed upon completion of the assembly of the base member 51 and the covering member 52. In this manner, the connection units 82 are accommodated in and locked by the locking bodies 56. The relative positional relation between the first electrical connection structure 41A and the connection member 81 connected to each other in the above-described manner is basically kept unchanged except that the connection units 82 may be relatively moved with respect to the locking bodies 56 due to the backlash resulting from the clearance between the locking body 56 and the connection unit 82.

The connection member 81 is provided with notches 83 having the first wiring portions 42a inserted therein for the respective first wiring portions 42a to prevent the first wiring portions 42a from getting jammed between the connection member 81 and the base member 51 (FIG. 10).

The connection structure between the connection member 81 and the second electrical connection structure 41B will now be described. In this example, the first electrical connection structure 41A and the second electrical connection structure 41B can be relatively rotated with respect to each other by relatively rotating the second electrical connection structure 41B with respect to the connection member 81. Either one of the second accommodation member 70 of the second electrical connection structure 41B and the connection member 81 of the movable portion 41C is provided with rotation shafts, whereas the other one is provided with bearings for the respective rotation shafts. In this example, rotation shafts 77 are provided to the second covering member 72B of the second accommodation member 70, whereas bearing portions 84 are provided to the connection member 81 (FIG. 14). Each of the rotation shafts 77 is a cylindrical body projected from the second covering member 72B, and two rotation shafts 77 are concentrically disposed in respective positions (FIG. 14 illustrates one of the rotation shafts 77). The connector module 40 is not configured such that the first electrical connection structure 41A and the second electrical connection structure 41B can relatively move with respect to each other after the connector module 40 is assembled to the oil pressure circuit body 10. In this configuration, the bearing portion 84 is provided for each rotation shaft 77 as a through-hole for having the rotation shaft 77 rotatably inserted.

For example, in the case that the connector module 40 has respective electrical wires 42 for the first electrical connection structure 41A and the second electrical connection structure 41B, the electrical wires 42 of the first electrical connection structure 41A have the first wiring portions 42a and the first electrical connection portions $42a_1$, whereas the electrical wires 42 of the second electrical connection structure 41B have the second wiring portions 42b and the second electrical connection portions $42b_1$. In this case, as described above, a connection body, which consists of the first electrical connection structure 41A and the connection member 81, and the second electrical connection structure 41B are formed. The second electrical connection structure 41B and the connection member 81 are thereafter assembled to each other through the rotation shafts 77 and the bearing portions 84. Furthermore, the free ends (ends opposite to the first electrical connection portions $42a_1$) of the electrical wires 42 of the first electrical connection structure 41A and the free ends (ends opposite to the second electrical connection portions $42b_1$) of the electrical wires 42 of the second electrical connection structure 41B are physically electrically connected to each other by welding or by using a terminal or the like.

In this connector module 40, however, a plurality of electrical wires 42 are arranged across the first electrical connection structure 41A and the second electrical connection structure 41B. In this example, the second electrical connection structure 41B is first formed, and the connection member 81 is assembled thereto. The electrical wires 42 projected from the connection body of the second electrical connection structure 41B and the connection member 81 are arranged on the base member 51 in the first electrical connection structure 41A side, and the first wiring portions 42a and the first electrical connection portions $42a_1$ are accordingly formed. The connection member 81 is assembled to the first accommodation member 50 when the base member 51 and the covering member 52 are integrated. In this manner, the connector module 40 in this configuration can be formed.

In the connector module 40 formed as described above, the first wiring portions 42a and the second wiring portions 42b are arranged on the first accommodation member 50 and the second accommodation member 70. This configuration allows each of the first wiring portions 42a (the first electrical connection portion $42a_1$) and each of the second wiring portions 42b (the second electrical connection portion $42b_1$) to be disposed at respective desired positions by absorbing tolerance variations of the first accommodation member 50 and the second accommodation member 70. Consequently, the connector module 40 can facilitate the connection operation and achieve accurate connection between the first electrical connection portion $42a_1$ and the terminal 43 (in other words, mutual conductivity between the first electrical connection portion $42a_1$ and the terminal 43) and further facilitate the connection operation and achieve accurate connection between the second electrical connection portion $42b_1$ and the terminal 31. The cost of the connector module 40 can be therefore reduced. In the case of replacing the electrical wires 42 with rigid members (such as a bus bar and a rigid substrate), a high-accuracy rigid member with tolerance variations decreased therein needs to be formed and arranged so as to assure accurate connection between the terminal 31 and the terminal 43. This configuration may problematically increase the cost. With use of the electrical wires 42, the cost of the connector module 40 can be reduced.

The connector module 40 includes the movable portion 41C between the first electrical connection structure 41A and the second electrical connection structure 41B and further has the electrical wires 42 (the connection portions 42c serving as movable electrical wire portions) arranged on the movable portion 41C. This configuration allows the positional relation between the first electrical connection structure 41A and the second electrical connection structure 41B to be relatively changed with the movable portion 41C interposed therebetween. This configuration allows the connector module 40 to install the first electrical connection structure 41A and the second electrical connection structure 41B to the driving system placing unit 10A and the control system placing unit 10B, respectively, regardless of changes in the relative positional relation caused by tolerance variations between the driving system placing unit 10A and the control system placing unit 10B of the oil pressure circuit body 10. Compared with use of rigid members (such as a bus bar and a rigid substrate), the connector module 40 using the electrical wires 42 can facilitate the assembly operation and achieve accurate assembly to the oil pressure circuit body 10. The cost of the connector module 40 can be therefore reduced. To make the connector module 40 more flexible to changes in the positional relation between the driving system placing unit 10A and the control system placing unit 10B caused by tolerance variations therebetween, such a method is effective that increases the amount of change (specifically, the amount of change in a direction different from the relative rotation direction) in the relative positional relation between the first electrical connection structure 41A and the second electrical connection structure 41B by providing the connector module 40 with no connection members 81, by increasing the amount of backlash between the connection member 81 and the first electrical connection structure 41A or between the connection member 81 and the second electrical connection structure 41B, or by other methods.

Furthermore, after the assembly, the movable portion 41C is capable of absorbing force (such as force generated with thermal contraction and thermal expansion caused by heat of the hydraulic oil and force physically externally applied) affecting the first electrical connection structure 41A and the second electrical connection structure 41B. Compared with use of rigid members, the connector module 40 using the electrical wires 42 can therefore improve durability.

Furthermore, even if the installation surface of the driving system placing unit 10A for the first electrical connection structure 41A and the installation surface of the control system placing unit 10B for the second electrical connection structure 41B are arranged in a substantially coplanar manner (FIG. 17), or even if the respective installation surfaces form an angle therebetween (FIGS. 18 and 19), as long as the driving system placing unit 10A and the control system placing unit 10B each have no changes in their shapes (in other words, no changes in the circuit of the oil pressure circuit body 10) and the distance therebetween (in other words, the size of the connection unit 10C) is kept almost unchanged, the connector module 40 can be installed to any type of oil pressure circuit body 10 as described above by adjusting the angle formed by the first electrical connection structure 41A and the second electrical connection structure 41B to the angle formed by the installation surfaces. With this arrangement, the connector module 40 can be shared between different types of oil pressure circuit body 10. The cost of the connector module 40 can be therefore reduced. In the case that the respective installation surfaces form a sharp angle and the connection portions 42c serving as movable electrical wire portions have an insufficient path length, the path length is extended such that the first electrical connection structure 41A and the second electrical connection structure 41B can be installed to the respective installation surfaces.

In another case, even if the distance between the driving system placing unit 10A and the control system placing unit 10B is markedly changed with the respective shapes unchanged (FIG. 20), the connector module 40 can be installed to this type of oil pressure circuit body 10 different in the distance by arranging the first wiring portions 42a and the second wiring portions 42b, which are positioned ahead and behind the connection portions 42c, in such a manner that the path length of the connection portions 42c serving as movable electrical wire portions is extended or shortened. The connector module 40 can be adaptable to each type of oil pressure circuit body 10 different in the distance merely by changing the length of the electrical wires 42. The cost of the connector module 40 can be therefore reduced. Furthermore, the connector module 40 can be commonly used in the oil pressure circuit bodies 10 each having different distances by adjusting the path length of the connection portions 42c to the largest distance between the driving system placing unit 10A and the control system placing unit 10B. The cost of the connector module 40 can be therefore reduced. Each type of connector module 40 may have the connection member 81 formed on the movable portion 41C or may have no connection members 81 formed on the movable portion 41C unless durability of the connection portions 42c is decreased.

Even when the shape of the driving system placing unit 10A or the control system placing unit 10B is changed (in other words, even when there is a change in the circuit of the oil pressure circuit body 10), the connector module 40 is adaptable to the oil pressure circuit body 10 having a changed circuit by changing the route for arranging the electrical wires 42. In other words, partially changing parts of the connector module 40 in a manner corresponding to the oil pressure circuit body 10 having a changed circuit can make the connector module 40 adaptable to this oil pressure circuit body 10. Compared with the case of using rigid members or a wire harness where all parts may need to be changed, the cost of the connector module 40 can be further reduced.

Furthermore, the connector module 40 can be formed by using various apparatuses such as a wiring machine. The connector module 40 can therefore eliminate or reduce manual operations by an operator compared with a conventional connector module manually wiring the electromagnetic valves 20 and the control unit 30 with a wire harness. The connector module 40 exerts the same advantageous effects even when compared with a connector module using rigid members instead of the electrical wires 42. Use of rigid members needs a working space for a suction machine sucking and arranging the rigid members. If the working space is not available, the rigid members need to be manually arranged. From these points of view, the connector module 40 can achieve more satisfactory productivity and further reduce the cost. The connector module 40 uses coated electrical wires 42 as described above, and in the connector module 40, the connection parts (welding points) connected to the counterpart units may need to be applied with a measurement (such as the insulating member 75) against the hydraulic oil. The connector module 40 can therefore achieve more satisfactory productivity and further reduce the cost. Compared with the connector module 40, use of a wire harness may problematically increase the size of the module because the wire harness includes an electrical wire bundle.

This connector module 40 can further reduce the cost compared with the module using an expensive flexible printed circuit board.

The connector module 40 in this embodiment can therefore reduce the cost while achieving more satisfactory productivity and durability. The hydraulic pressure control device (the oil pressure control device 1) in this embodiment includes this connector module 40 and can therefore share the advantageous effects exerted by the connector module 40.

In the earlier description, the connector module 40 in this embodiment is adaptable to the oil pressure circuit body 10 configured such that the installation surface of the driving system placing unit 10A for the first electrical connection structure 41A and the installation surface of the control system placing unit 10B for the second electrical connection structure 41B are aligned in a substantially coplanar manner and to the oil pressure circuit body 10 configured such that the respective installation surfaces form an angle (regardless of the degree of the angle) therebetween. This connector module 40 is further adaptable to other features of the oil pressure circuit body 10.

Figure 21:
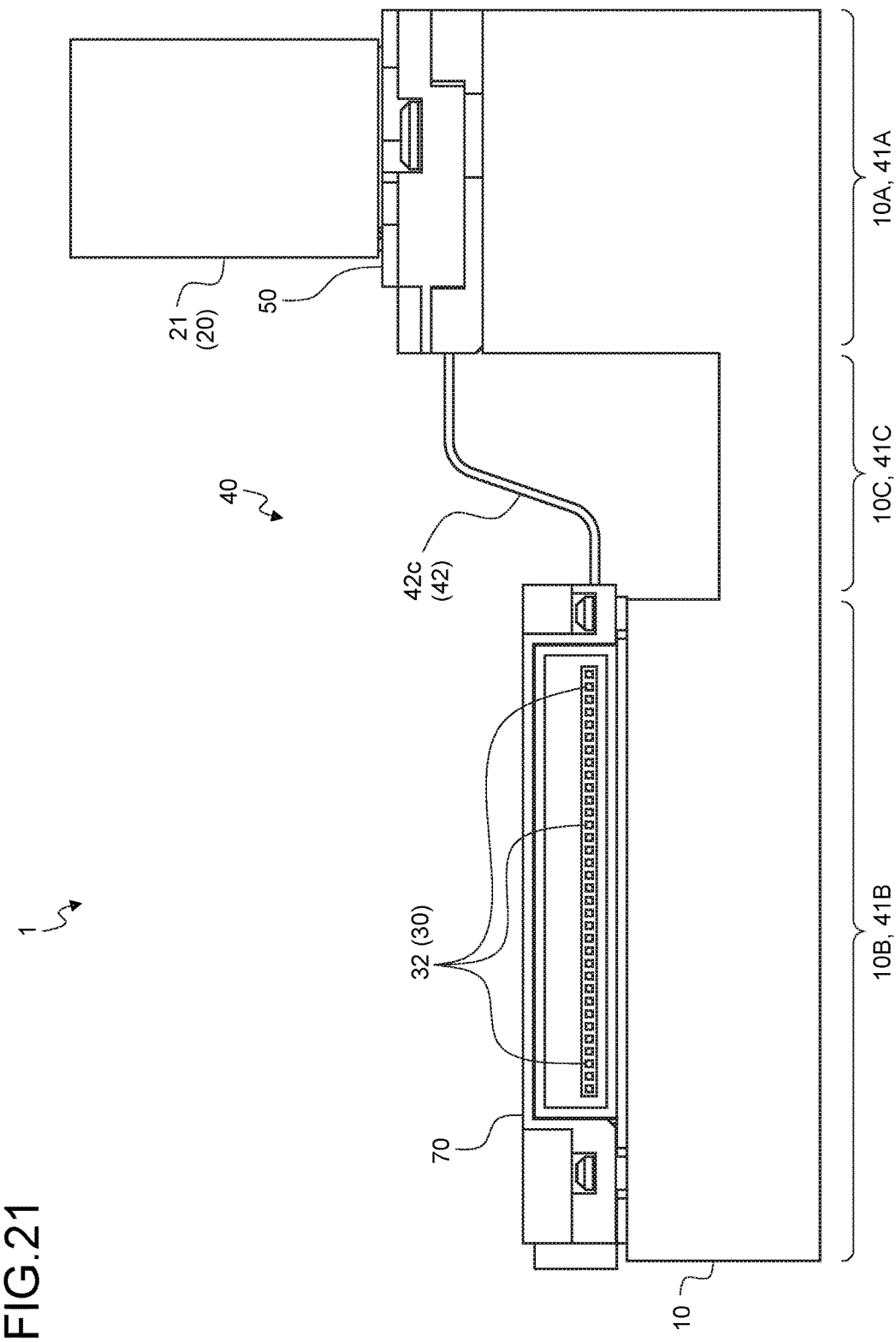
FIG. 21 is a view of the connector module applied to still another type of oil pressure circuit body (hydraulic pressure circuit body)

For example, the oil pressure circuit body 10 illustrated in FIG. 21 arranges the installation surface of the driving system placing unit 10A for the first electrical connection structure 41A and the installation surface of the control system placing unit 10B for the second electrical connection structure 41B in different levels. In this configuration, the installation surface of the driving system placing unit 10A is lower than the installation surface of the control system placing unit 10B. The connector module 40 can be installed to this oil pressure circuit body 10 by adjusting the path length of the connection portions 42c of the electrical wires 42 so as to connect the first electrical connection structure 41A and the second electrical connection structure 41B installed to the respective installation surfaces.

Figure 22:
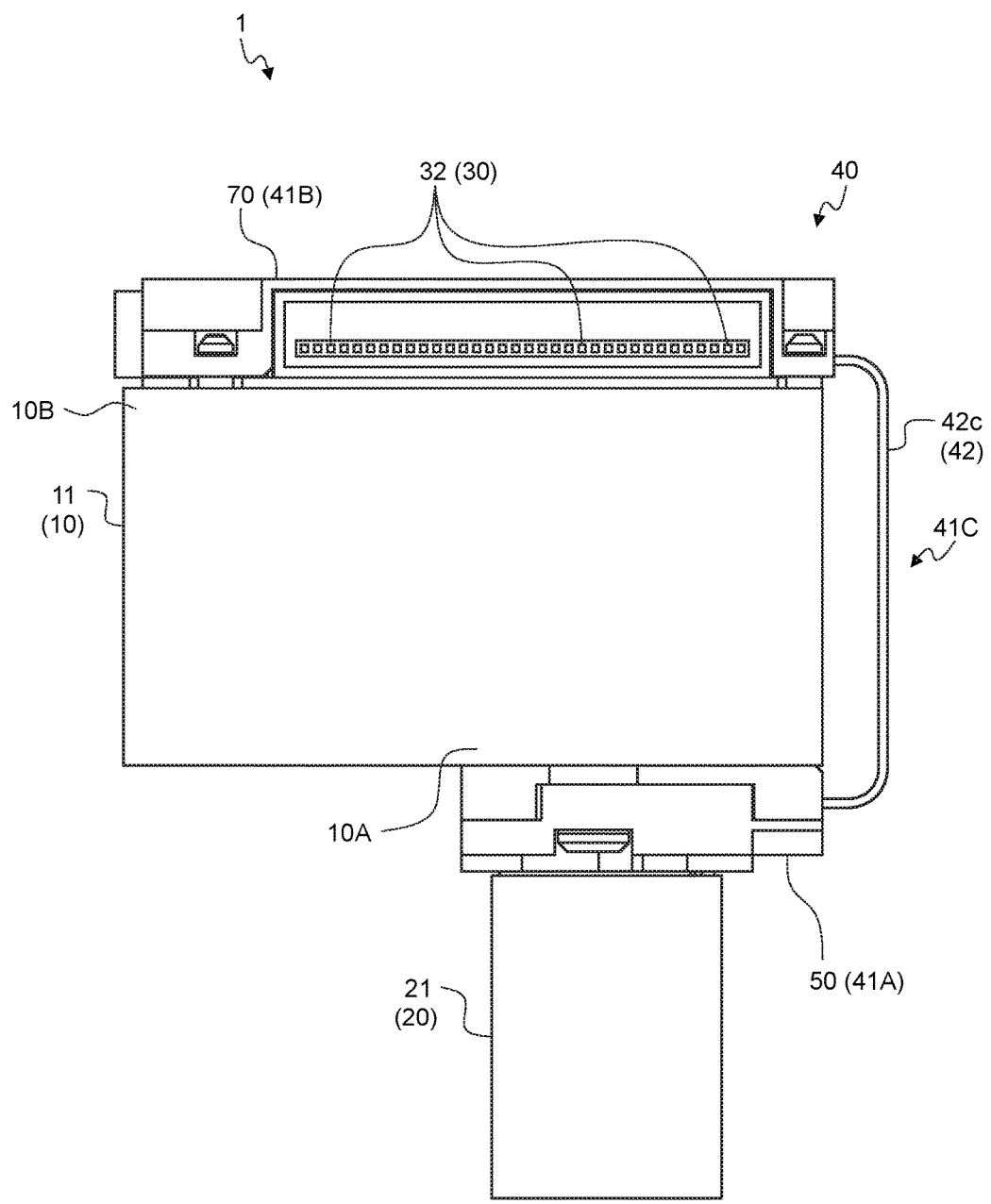
FIG. 22 is a view of the connector module applied to still another type of oil pressure circuit body (hydraulic pressure circuit body).

The oil pressure circuit body 10 illustrated in FIG. 22 has a rectangular parallelepiped main portion 11 and arranges the installation surface of the control system placing unit 10B on the back of the installation surface of the driving system placing unit 10A. The connector module 40 can also be installed to this oil pressure circuit body 10 by adjusting the path length of the connection portions 42c of the electrical wires 42 so as to connect the first electrical connection structure 41A and the second electrical connection structure 41B installed to the respective installation surfaces.

Although not illustrated, the driving system placing unit 10A of the oil pressure circuit body 10 may have its installation surface configured with a plurality of planes. In the oil pressure circuit body 10, the electromagnetic valves 20 are disposed in the respective planes. For example, an installation surface of the driving system placing unit 10A is arranged on a level different from the level of the installation surface of the control system placing unit 10B. Another installation surface of the driving system placing unit 10A forms an angle with the installation surface of the control system placing unit 10B. The connector module 40 in this embodiment is therefore configured such that the first electrical connection structure 41A is assembled to each installation surface of the driving system placing unit 10A and the first electrical connection structures 41A are connected with the second electrical connection structure 41B using the respective electrical wires 42. The connector module 40 can be installed to this oil pressure circuit body 10 by appropriately adjusting the path lengths of the connection portions 42c of the electrical wires 42 in each first electrical connection structure 41A.

These types of connector module 40 may have the connection member 81 formed on the movable portion 41C or may have no connection members 81 formed on the movable portion 41C unless durability of the connection portions 42c is decreased.

In the connector module 40 in this embodiment, the first electrical connection structure 41A and the second electrical connection structure 41B can change the respective positions in a manner selected from a first state (FIG. 17) where the relative positional relation therebetween is substantially coplanar across the movable portion 41C and second states (FIGS. 18 to 22) where the relative positional relation therebetween across the movable portion 41C is changed from the first state. When the connector module 40 is shipped, the connector module 40 is packed in a packing member such as a packing box in the first state, that is, with the first electrical connection structure 41A and the second electrical connection structure 41B aligned in a substantially coplanar manner. This method allows more connector modules 40 to be packed in the packing member compared with the second states. Consequently, more connector modules 40 can be shipped in a shipment, which can further reduce the cost.

The connector module according to the embodiments has a movable portion between electrical connection structures disposed next to each other. This configuration exerts advantageous effects in reducing the cost while sustaining satisfactory productivity and durability. Because the hydraulic pressure control device according to the embodiments includes this connector module, the hydraulic pressure control device can share the advantageous effects exerted by the connector module.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:
1. A connector module comprising:
   a plurality of electrical connection structures including a plurality of electrical wires each having a wiring portion and an electrical connection portion directly or indirectly electrically connected to an electrical connection target at one end of the wiring portion, and wiring plates on which the wiring portions are wired, wherein
   in the electrical connection structures disposed next to each other, the other end of the wiring portion of one of the electrical connection structures establishes an electrical connection relation with the other end of the wiring portion of the other electrical connection structure to permit a first electrical connection target to control driving of a second electrical connection target, and between the electrical connection structures disposed next to each other, a movable portion capable of changing a relative positional relation therebetween is provided.

2. The connector module according to claim 1, wherein the electrical wire is covered by an insulating coating, and a physical electrical connection part between the electrical wire and a counterpart is covered by an insulating member.

3. The connector module according to claim 2, wherein the electrical connection structures disposed next to each other are connected to each other by the electrical wire that has the wiring portions arranged on the wiring plates of the respective electrical connection structures, the electrical connection portions formed at both ends, and a movable electrical wire portion disposed between the wiring portions and on the movable portion.

4. The connector module according to claim 2, wherein one of the electrical connection structures disposed next to each other is configured to electrically connect an electromagnetic valve, which is a control valve of a hydraulic pressure circuit body having a hydraulic pressure circuit for moving an operating fluid of an object to be controlled and serves as the electrical connection target capable of adjusting a flow rate of the operating fluid in the hydraulic pressure circuit, to the electrical connection portion of the electrical connection structure, and the other one of the electrical connection structures disposed next to each other is configured to electrically connect a control unit, which serves as the electrical connection target controlling driving of the electromagnetic valve, to the electrical connection portion of the other electrical connection structure.

5. The connector module according to claim 1, wherein the electrical connection structures disposed next to each other are connected to each other by the electrical wire that has the wiring portions wired on the wiring plates of the respective electrical connection structures, the electrical connection portions formed at both ends, and a movable electrical wire portion disposed between the wiring portions and on the movable portion.

6. A connector module comprising:
a plurality of electrical connection structures including a plurality of electrical wires each having a wiring portion and an electrical connection portion directly or indirectly electrically connected to an electrical connection target at one end of the wiring portion, and wiring plates on which the wiring portions are wired, wherein in the electrical connection structures disposed next to each other, the other end of the wiring portion of one of the electrical connection structures establishes an electrical connection relation with the other end of the wiring portion of the other electrical connection structure, between the electrical connection structures disposed next to each other, a movable portion capable of changing a relative positional relation therebetween is provided and one of the electrical connection structures disposed next to each other is configured to electrically connect an electromagnetic valve, which is a control valve of a hydraulic pressure circuit body having a hydraulic pressure circuit for moving an operating fluid of an object to be controlled and serves as the electrical connection target capable of adjusting a flow rate of the operating fluid in the hydraulic pressure circuit, to the electrical connection portion of the electrical connection structure, and the other one of the electrical connection structures disposed next to each other is configured to electrically connect a control unit, which serves as the electrical connection target controlling driving of the electromagnetic valve, to the electrical connection portion of the other electrical connection structure.

7. A hydraulic pressure control device comprising:
a hydraulic pressure circuit body that includes a hydraulic pressure circuit for moving an operating fluid of an object to be controlled;
a control unit that controls the flow rate of the operating fluid in the hydraulic pressure circuit;
an electromagnetic valve that is connected to the hydraulic pressure circuit body and adjusts the flow rate of the operating fluid in the hydraulic pressure circuit in accordance with driving control by the control unit; and
a plurality of electrical connection structures that electrically connect at least two electrical connection targets to each other, wherein the electrical connection structure includes a plurality of electrical wires each having a wiring portion and an electrical connection portion directly or indirectly electrically connected to the electrical connection target at one end of the wiring portion and wiring plates on which the wiring portions are wired, in the electrical connection structures disposed next to each other, one end of the wiring portion of one of the electrical connection structures establishes an electrical connection relation with the other end of the wiring portion of the other electrical connection structure, between the electrical connection structures disposed next to each other, a movable portion capable of changing a relative positional relation therebetween is provided, and one of the electrical connection structures disposed next to each other has the electromagnetic valve serve as the electrical connection target and the other one of the electrical connection structures has the control unit serve as the electrical connection target.

* * * * *